US012648034B2

(12) United States Patent
Wang et al.

(10) Patent No.: US 12,648,034 B2
(45) Date of Patent: Jun. 2, 2026

(54) DEVICE NETWORKING METHOD, ELECTRONIC DEVICE, AND STORAGE MEDIUM FOR MAINTAINING CONNECTIONS BETWEEN ELECTRONIC DEVICES

(71) Applicant: Huawei Technologies Co., Ltd., Shenzhen (CN)

(72) Inventors: Chenglu Wang, Shenzhen (CN); Shijun Li, Xi'an (CN); Weibo Hou, Shenzhen (CN); Jie Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 18/288,682

(22) PCT Filed: Apr. 2, 2022

(86) PCT No.: PCT/CN2022/085166
§ 371 (c)(1),
(2) Date: Oct. 27, 2023

(87) PCT Pub. No.: WO2022/228051

PCT Pub. Date: Nov. 3, 2022

(65) Prior Publication Data
US 2024/0215088 A1      Jun. 27, 2024

(30) Foreign Application Priority Data

Apr. 28, 2021    (CN) .......................... 202110464411.6
Nov. 9, 2021    (CN) .......................... 202111322529.1

(51) Int. Cl.
*H04W 76/14*          (2018.01)

(52) U.S. Cl.
CPC ................................. *H04W 76/14* (2018.02)

(58) Field of Classification Search
CPC ....... H04W 88/06; H04W 84/12; H04W 4/80; H04W 16/14; H04W 36/1446;
(Continued)

(56) References Cited

U.S. PATENT DOCUMENTS 8,625,563 B1 *   1/2014   Fleming .............. H04L 47/6215
                                                    370/444
10,117,286 B1 *   10/2018   Jorgovanovic .......... H04W 4/80
(Continued)

FOREIGN PATENT DOCUMENTS

CN          201638052 U      11/2010
CN          105357283 A       2/2016
(Continued)

OTHER PUBLICATIONS

Anonymous, "Wi-Fi Driver", Jul. 11, 2020, XP093111068, Retrieved from the Internet: URL:https://web.archive.org/web/20200711200432/https://docs.espressif.com/projects/esp-idf/en/latest/esp32/api-guides/wifi.html#wi-fi-beacon-timeout, retrieved on Dec. 11, 2023, total 58 pages.

*Primary Examiner* — Allahyar Kasraian
(74) *Attorney, Agent, or Firm* — Slater Matsil, LLP

(57) ABSTRACT

A device networking method. The method includes: A first electronic device establishes a first communication connection with a second electronic device, where the first communication connection includes that the first electronic device and the second electronic device are connected in a first communication manner and in a second communication manner; the first electronic device receives a packet sent by the second electronic device, in the first communication manner in a first time period; the first electronic device determines, based on the packet, that the first communication connection with the second electronic device is valid in a second time period; and the first electronic device per-
(Continued)

forms service communication with the second electronic device in the second communication manner in the second time period.

20 Claims, 11 Drawing Sheets

(58) Field of Classification Search
CPC ..... H04W 76/10; H04W 76/14; H04W 76/15; H04L 45/24; H04L 12/2859; H04L 65/1069
See application file for complete search history.

(56) References Cited

U.S. PATENT DOCUMENTS

| | | | |
|---|---|---|---|
| 2011/0222524 A1* | 9/2011 | Thomson | H04W 74/0816 |
| | | | 370/339 |
| 2015/0215958 A1* | 7/2015 | Banerjea | H04W 16/14 |
| | | | 370/329 |
| 2016/0066274 A1* | 3/2016 | Pujari | H04W 52/0235 |
| | | | 370/311 |
| 2016/0088424 A1 | 3/2016 | Polo et al. | |
| 2018/0160334 A1 | 6/2018 | Deshpande | |

| | | | |
|---|---|---|---|
| 2019/0349851 A1 | 11/2019 | Kim et al. | |
| 2020/0319698 A1 | 10/2020 | Mizuno et al. | |
| 2021/0352669 A1* | 11/2021 | Lu | H04W 72/23 |

FOREIGN PATENT DOCUMENTS

| | | |
|---|---|---|
| CN | 107517136 A | 12/2017 |
| CN | 107634918 A | 1/2018 |
| CN | 110855539 A | 2/2020 |
| CN | 111010693 A | 4/2020 |
| CN | 111417140 A | 7/2020 |
| CN | 111556555 A | 8/2020 |
| CN | 112019616 A | 12/2020 |
| CN | 114364026 A | 4/2022 |
| CN | 115484576 A | 12/2022 |
| CN | 115622974 A | 1/2023 |
| CN | 116017310 A | 4/2023 |
| IN | 202011018278 A | 6/2020 |
| JP | 2010258619 A | 11/2010 |
| JP | 2017518657 A | 7/2017 |
| JP | 2018032928 A | 3/2018 |
| KR | 20130039213 A | 4/2013 |
| KR | 20150125531 A | 11/2015 |
| WO | 2008120332 A1 | 10/2008 |
| WO | 2021143314 A1 | 7/2021 |

* cited by examiner

STA 1 STA 2 STA N

STA N STA 2 STA 1 AP

Scan a nearby AP by using Wi-Fi

Send SSIDs

Select a corresponding SSID and enter a password for authentication

Send a beacon frame

Listen to the beacon frame to keep alive

Master device

Slave device A    Slave device B    Slave device N

Master device

Slave device A    Slave device B    Slave device N

Send a broadcast message

Receive the broadcast message

Send a scan request

Reply with a scan response

Establish a connection

Use a GATT for communication

Send a connection event

Listen to keep alive

Super terminal

Central
control device

Super terminal                    Rich device

Thin device

Super terminal                    Rich device

Thin device

Communication system 200

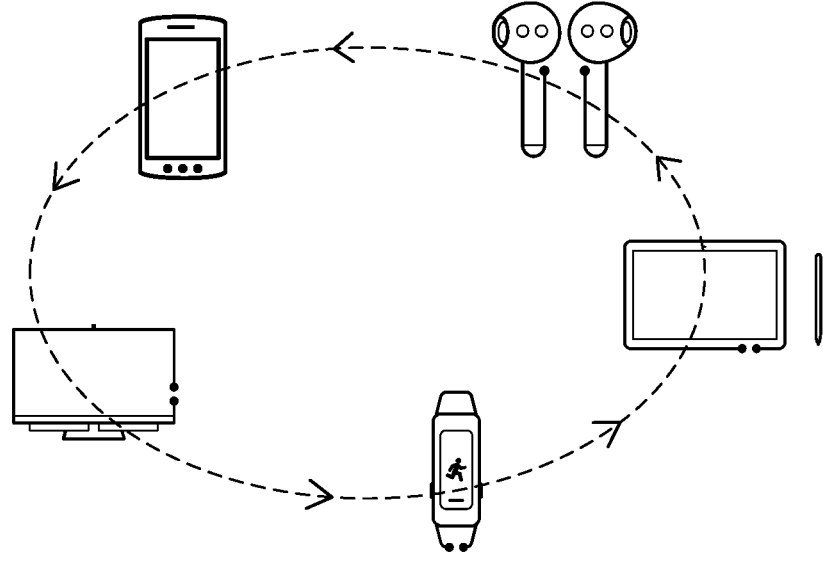

FIG. 10

S10: A first electronic device sends a discovery message to a second electronic device S20: The first electronic device sends an authentication message to the second electronic device S30: The first electronic device establishes a persistent connection with the second electronic device

FIG. 11a

Packet receiving moment

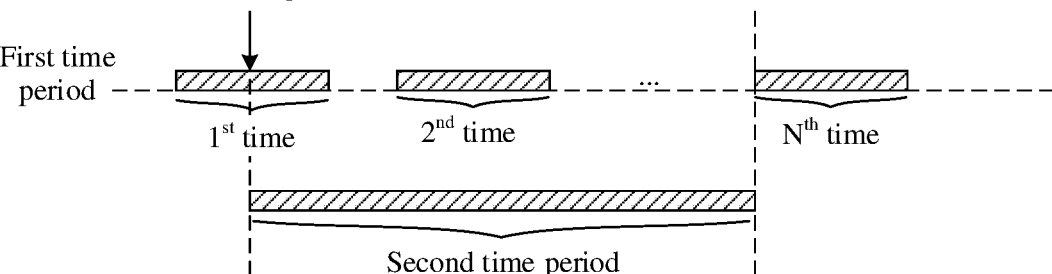

First time period $1^{st}$ time     $2^{nd}$ time     $N^{th}$ time

Second time period

FIG. 11b

DEVICE NETWORKING METHOD, ELECTRONIC DEVICE, AND STORAGE MEDIUM FOR MAINTAINING CONNECTIONS BETWEEN ELECTRONIC DEVICES

CROSS REFERENCE TO RELATED APPLICATIONS

This application is a national stage of International Application No. PCT/CN2022/085166, filed on Apr. 2, 2022, which claims priority to Chinese Patent Application No. 202111322529.1, filed on Nov. 9, 2021 and Chinese Patent Application No. 202110464411.6, filed on Apr. 28, 2021. All of the aforementioned patent applications are hereby incorporated by reference in their entireties.

TECHNICAL FIELD

This application relates to the field of communication technologies, and in particular, to a device networking method, an electronic device, and a storage medium.

BACKGROUND

With development of smart devices, a user or a home usually has a plurality of electronic devices that can communicate with each other. Various electronic devices usually have respective device characteristics. For example, a mobile phone is more portable, a television screen has a better display effect, and a speaker has a better sound quality effect. To make full use of device characteristics of different electronic devices, the plurality of electronic devices may be networked, so that the plurality of electronic devices are interworked for cooperative work.

A networking process of a star topology structure is used as an example. When the plurality of electronic devices are networked, a preset electronic device (for example, a television, a router, or a mobile phone) may be determined as a central device. Further, each electronic device other than the central device may be used as a peripheral device to establish a communication connection (for example, a Bluetooth connection or a Wi-Fi connection) with the central device, to form a local area network of the star topology structure. In this way, the central device, as a central node, may be configured to manage and control each peripheral device on the local area network, so as to complete a corresponding work task.

However, each time before a peripheral device performs service communication with another peripheral device, discovery and authentication are required first to establish a communication connection, and then service communication is performed. In this case, a delay of communication between peripheral devices is relatively high, and user experience is further affected.

SUMMARY

Embodiments of this application provide a device networking method, an electronic device, and a storage medium, to resolve a problem that a delay of communication between a first electronic device and a second electronic device is relatively high.

To achieve the foregoing objective, the following technical solutions are used in embodiments of this application.

According to a first aspect, a device networking method is provided, which is applied to a communication system.

The communication system includes a plurality of electronic devices. The method includes: A first electronic device establishes a first communication connection with a second electronic device, where the first communication connection includes that the first electronic device and the second electronic device are connected in a first communication manner and in a second communication manner; the first electronic device receives a packet sent by the second electronic device, in the first communication manner in a first time period; the first electronic device determines, based on the packet, that the first communication connection with the second electronic device is valid in a second time period; and the first electronic device performs service communication with the second electronic device in the second communication manner in the second time period.

Based on the first aspect, when establishing the first communication connection with the second electronic device, the first electronic device receives the packet sent by the second electronic device, in the first communication manner in the first time period. The first electronic device may determine, based on the packet, that the first communication connection with the second electronic device is valid in the second time period. To be specific, the first electronic device determines, based on the packet, that the first electronic device maintains a connection (that is, keepalive) with the second electronic device in the second time period, so that the first electronic device performs service communication with the second electronic device in the second communication manner in the second time period. Because the first electronic device determines, based on the packet, that the first electronic device and the second electronic device keep alive in the second time period, the first electronic device may directly perform service communication with the second electronic device in the second time period, without determining the keepalive before each time of service communication, thereby improving a communication delay. In addition, because the first electronic device establishes the first communication connection with the second electronic device in the first communication manner and in the second communication manner, the first electronic device may receive the packet sent by the second electronic device, and the first electronic device may perform service communication with the second electronic device in different communication manners, thereby improving communication reliability.

In a possible design of the first aspect, before the first electronic device receives the packet sent by the second electronic device, in the first communication manner in the first time period, the method further includes: The first electronic device broadcasts or unicasts a request packet in the first communication manner and in the second communication manner in the first time period. The request packet indicates that the first electronic device requests to maintain the first communication connection with the second electronic device.

In this design, the first electronic device may broadcast or unicast the request packet in the first communication manner and in the second communication manner in the first time period, so that the second electronic device replies with a packet based on the request packet, thereby improving communication reliability.

In a possible design of the first aspect, when the first communication connection is valid in the second time period, the first electronic device stores connection information of a second communication connection. That the first electronic device performs service communication with the second electronic device in the second communication manner in the second time period includes: The first electronic device resumes, based on the connection information, the first communication connection established with the second electronic device and performs service communication.

In this design, the first electronic device may quickly resume, based on the connection information (for example, information about the second electronic device), the first communication connection established with the second electronic device and perform service communication, which further improves a communication delay.

In a possible design of the first aspect, a priority of the first electronic device is higher than a priority of the second electronic device. The priority indicates hardware performance of a device. Hardware performance of a device with a high priority is higher than hardware performance of a device with a low priority. The hardware performance includes one or more of processor performance, memory performance, hard disk performance, or a network capability. That a first electronic device establishes a first communication connection with a second electronic device includes: The first electronic device establishes the first communication connection with the second electronic device, and determines the priority of the second electronic device. That the first electronic device determines, based on the packet, that the first communication connection with the second electronic device is valid in a second time period includes: When the priority of the first electronic device is higher than that of the second electronic device, the first electronic device determines, based on the packet, that the first communication connection with the second electronic device is valid in the second time period.

In this design, when establishing the first communication connection with the second electronic device, the first electronic device determines the priority of the second electronic device. When the priority of the first electronic device is higher than that of the second electronic device, the first electronic device determines, based on the packet, that the first communication connection with the second electronic device is valid in the second time period. To be specific, the first electronic device with a higher priority determines which of the first electronic device and the second electronic device sends a request packet and receives a packet, thereby further improving communication reliability.

In a possible design of the first aspect, the first time period is periodically set, and the first time period is a first time period set for a first time. The method further includes: When the first electronic device is in the first time period that is a first time period set for a second time, the first electronic device determines to be disconnected from the second electronic device; or when the first electronic device is in the first time periods that are a first time period set for N consecutive times, the first electronic device determines to be disconnected from the second electronic device; or when the first time period and the second time period at least partially overlap and the first electronic device does not receive a response packet in a first time period within the second time period, the first electronic device determines to be disconnected from the second electronic device.

In this design, when the first electronic device does not receive, for a long time, the packet sent by the second electronic device, the first electronic device determines to be disconnected from the second electronic device, helping improve communication reliability.

In a possible design of the first aspect, the method further includes: When the first electronic device performs service communication again with the second electronic device, the first electronic device re-establishes the first communication connection with the second electronic device.

In this design, when the first electronic device determines to be disconnected from the second electronic device, if the first electronic device performs service communication again with the second electronic device, the first electronic device re-establishes the first communication connection with the second electronic device, so that service communication can be normally performed, thereby improving communication reliability.

In a possible design of the first aspect, the packet includes one of a response packet, an inquiry packet, or a service packet.

In this design, the packet may be a response packet, an inquiry packet, or a service packet. Therefore, when the first electronic device receives any one of the response packet, the inquiry packet, or the service packet sent by the second electronic device, the first electronic device can determine that the first communication connection with the second electronic device is valid in the second time period, thereby further improving communication reliability.

In a possible design of the first aspect, the method further includes: When the first electronic device remains in a static state in the first time period and a quantity of times that the first electronic device receives the response packet sent by the second electronic device is greater than a first preset quantity of times, the first electronic device adjusts the first time period to a third time period. A length of the third time period is greater than a length of the first time period.

In this design, when the first electronic device remains in the static state for a long time and the quantity of times that the first electronic device receives the response packet sent by the second electronic device is greater than the first preset quantity of times, the first electronic device may adjust the first time period to the third time period. The length of the third time period is greater than the length of the first time period, that is, the first electronic device receives, in a slowdown mode, the packet sent by the second electronic device, which helps reduce device power consumption.

In a possible design of the first aspect, the method further includes: When the first electronic device is located in a preset scenario in the first time period and a quantity of times that the first electronic device receives the response packet sent by the second electronic device is greater than a second preset quantity of times, the first electronic device adjusts the first time period to a fourth time period. A length of the fourth time period is less than a length of the first time period.

In this design, when the first electronic device is located in the preset scenario for a long time and the quantity of times that the first electronic device receives the response packet sent by the second electronic device is greater than the second preset quantity of times, the first electronic device may adjust the first time period to the fourth time period. The length of the fourth time period is less than the length of the first time period, that is, the first electronic device receives, in an acceleration mode, the packet sent by the second electronic device, which ensures that the first electronic device maintains a connection with the second electronic device.

In a possible design of the first aspect, the method further includes: When the preset scenario in which the first electronic device is located changes, the first electronic device restores the fourth time period to the first time period. A change of the preset scenario includes the first electronic device changing from a screen-off display to a screen-on display.

In this design, when the first electronic device changes from the screen-off display to the screen-on display, the first electronic device restores the first time period and receives a packet in the first time period, helping reduce device power consumption.

In a possible design of the first aspect, the method further includes: When the scenario in which the first electronic device is located changes, the first electronic device restores the fourth time period to the first time period. A change of the preset scenario includes a change of a use state of the first electronic device.

In this design, when the use state of the first electronic device changes, the first electronic device restores the first time period and receives a packet in the first time period, helping reduce device power consumption.

In a possible design of the first aspect, the method further includes: When the scenario in which the first electronic device is located changes, the first electronic device re-discovers a nearby device and establishes the first communication connection, where a change of the scenario includes an absolute location change, a spatial location change, and a vehicle change; and the first electronic device receives a packet sent by the nearby device, in the first communication manner in the first time period.

In this design, when an absolute location changes, a spatial location changes, and a vehicle changes in the first electronic device, the first electronic device re-discovers the nearby device and establishes the first communication connection. The first electronic device receives the packet sent by the nearby device, in the first communication manner in the first time period. In this way, the first electronic device can maintain a connection with the nearby device, thereby improving communication reliability.

In a possible design of the first aspect, the method further includes: When a last electronic device of all electronic devices that establish the first communication connection with the first electronic device is offline, the first electronic device re-discovers a nearby device and establishes the first communication connection; and the first electronic device receives a packet sent by the nearby device, in the first communication manner in the first time period.

In this design, when all the electronic devices that establish the first communication connection with the first electronic device are offline, the first electronic device re-discovers the nearby device and establishes the first communication connection. Later, the first electronic device receives the packet sent by the nearby device, in the first communication manner in the first time period. In this way, the first electronic device can maintain a connection with the nearby device, thereby improving communication reliability.

In a possible design of the first aspect, the method further includes: When a network status of the communication system in which the plurality of electronic devices are located changes, the first electronic device sends a network change message to the second electronic device and re-determines a physical communication manner used when the first communication connection is established with the second electronic device.

In this design, when the network status of the plurality of electronic devices changes (for example, network interruption or network delay), the first electronic device notifies the second electronic device that the network status has changed and re-determines the physical communication manner used when the first communication connection is established with the second electronic device, thereby improving communication reliability.

In a possible design of the first aspect, the method further includes: The first electronic device determines a wake-up period of the first electronic device based on a periodic connection established between a first application on the first electronic device and a cloud server of the first application, where the first application is any application on the first electronic device; and the first electronic device synchronizes the wake-up period to the second electronic device, where the wake-up period is the same as the first time period that is periodically set.

In this design, the first electronic device sets the periodic first time period based on the wake-up period. To be specific, the wake-up period is the same as the first time period that is periodically set. In this way, the first electronic device and the second electronic device can receive a packet in the wake-up period, helping reduce device power consumption.

In a possible design of the first aspect, the method further includes: The first electronic device displays a first interface in response to an operation of a user on a second application, where the first interface includes at least one electronic device that maintains the first communication connection with the first electronic device, and the at least one electronic device includes the second electronic device; and the first electronic device performs service communication with the second electronic device in response to an operation of the user on the second electronic device.

In this design, the first interface of the first electronic device may directly display the at least one electronic device that maintains the first communication connection with the first electronic device, and the at least one electronic device includes the second electronic device. Therefore, when the first electronic device attempts to perform service communication with the second electronic device, the first electronic device can directly perform service communication with the second electronic device without first scanning the second electronic device, thereby reducing a waiting time of the user and improving user experience.

In a possible design of the first aspect, the first interface further includes at least one electronic device that is disconnected from the first electronic device.

In this design, the first interface further displays the at least one electronic device that is disconnected from the first electronic device. Therefore, when the user holds the first electronic device that needs to perform service communication with any electronic device in the at least one electronic device, the user may directly tap the electronic device. In this way, the electronic device establishes the first communication connection with the first electronic device, thereby improving user experience.

In a possible design of the first aspect, the first interface further includes indication information. The indication information indicates that a third electronic device is being scanned. The third electronic device is a device that is in the plurality of electronic devices and is disconnected from the first electronic device; or the third electronic device is a device that establishes the first communication connection with the first electronic device for a first time.

In this design, based on the indication information displayed in the first interface, the user may know: the third electronic device that is disconnected from the first electronic device; or the electronic device that establishes the first communication connection with the first electronic device for the first time, helping further improve user experience.

In a possible design of the first aspect, the first electronic device includes a processor. The processor includes a plurality of processing cores. The plurality of processing cores include a low-power core. The method further includes: The first electronic device receives a packet sent by the second electronic device in the first time period by using the low-power core.

In this design, a keepalive mechanism of the first electronic device and the second electronic device is set on the low-power core, helping reduce device power consumption.

According to a second aspect, an electronic device is provided. The electronic device is a first electronic device. The electronic device includes a memory and one or more processors. The memory stores computer program code. The computer program code includes computer instructions. When the computer instructions are executed by the processor, the electronic device is enabled to perform the following steps: The first electronic device establishes a first communication connection with a second electronic device, where the first communication connection includes that the first electronic device and the second electronic device are connected in a first communication manner and in a second communication manner; the first electronic device receives a packet sent by the second electronic device, in the first communication manner in a first time period; the first electronic device determines, based on the packet, that the first communication connection with the second electronic device is valid in a second time period; and the first electronic device performs service communication with the second electronic device in the second communication manner in the second time period.

In a possible design of the second aspect, before the first electronic device receives the packet sent by the second electronic device, in the first communication manner in the first time period, when the computer instructions are executed by the processor, the electronic device is enabled to further perform the following step: The first electronic device broadcasts or unicasts a request packet in the first communication manner and in the second communication manner in the first time period. The request packet indicates that the first electronic device requests to maintain the first communication connection with the second electronic device.

In a possible design of the second aspect, when the first communication connection is valid in the second time period, the first electronic device stores connection information of a second communication connection. When the computer instructions are executed by the processor, the electronic device is enabled to specifically perform the following step: The first electronic device resumes, based on the connection information, the first communication connection established with the second electronic device and performs service communication.

In a possible design of the second aspect, a priority of the first electronic device is higher than a priority of the second electronic device. The priority indicates hardware performance of a device. Hardware performance of a device with a high priority is higher than hardware performance of a device with a low priority. The hardware performance includes one or more of processor performance, memory performance, hard disk performance, or a network capability. When the computer instructions are executed by the processor, the electronic device is enabled to specifically perform the following step: The first electronic device establishes the first communication connection with the second electronic device, and determines the priority of the second electronic device. When the computer instructions are executed by the processor, the electronic device is enabled to specifically perform the following step: When the priority of the first electronic device is higher than that of the second electronic device, the first electronic device determines, based on the packet, that the first communication connection with the second electronic device is valid in the second time period.

In a possible design of the second aspect, the first time period is periodically set, and the first time period is a first time period set for a first time. When the computer instructions are executed by the processor, the electronic device is enabled to further perform the following steps: When the first electronic device is in the first time period that is a first time period set for a second time, the first electronic device determines to be disconnected from the second electronic device; or when the first electronic device is in the first time periods that are a first time period set for N consecutive times, the first electronic device determines to be disconnected from the second electronic device; or when the first time period and the second time period at least partially overlap and the first electronic device does not receive a response packet in a first time period within the second time period, the first electronic device determines to be disconnected from the second electronic device.

In a possible design of the second aspect, when the computer instructions are executed by the processor, the electronic device is enabled to further perform the following step: When the first electronic device performs service communication again with the second electronic device, the first electronic device re-establishes the first communication connection with the second electronic device.

In a possible design of the second aspect, the packet includes one of a response packet, an inquiry packet, or a service packet.

In a possible design of the second aspect, when the computer instructions are executed by the processor, the electronic device is enabled to further perform the following step: When the first electronic device remains in a static state in the first time period and a quantity of times that the first electronic device receives the response packet sent by the second electronic device is greater than a first preset quantity of times, the first electronic device adjusts the first time period to a third time period. A length of the third time period is greater than a length of the first time period.

In a possible design of the second aspect, when the computer instructions are executed by the processor, the electronic device is enabled to further perform the following step: When the first electronic device is located in a preset scenario in the first time period and a quantity of times that the first electronic device receives the response packet sent by the second electronic device is greater than a second preset quantity of times, the first electronic device adjusts the first time period to a fourth time period. A length of the fourth time period is less than a length of the first time period.

In a possible design of the second aspect, when the computer instructions are executed by the processor, the electronic device is enabled to further perform the following step: When the preset scenario in which the first electronic device is located changes, the first electronic device restores the fourth time period to the first time period. A change of the preset scenario includes the first electronic device changing from a screen-off display to a screen-on display.

In a possible design of the second aspect, when the computer instructions are executed by the processor, the electronic device is enabled to further perform the following step: When the scenario in which the first electronic device is located changes, the first electronic device restores the fourth time period to the first time period. A change of the preset scenario includes a change of a use state of the first electronic device.

In a possible design of the second aspect, when the computer instructions are executed by the processor, the electronic device is enabled to further perform the following steps: When the scenario in which the first electronic device is located changes, the first electronic device re-discovers a nearby device and establishes the first communication connection, where a change of the scenario includes an absolute location change, a spatial location change, and a vehicle change; and the first electronic device receives a packet sent by the nearby device, in the first communication manner in the first time period.

In a possible design of the second aspect, when the computer instructions are executed by the processor, the electronic device is enabled to further perform the following steps: When a last electronic device of all electronic devices that establish the first communication connection with the first electronic device is offline, the first electronic device re-discovers a nearby device and establishes the first communication connection; and the first electronic device receives a packet sent by the nearby device, in the first communication manner in the first time period.

In a possible design of the second aspect, when the computer instructions are executed by the processor, the electronic device is enabled to further perform the following step: When a network status of the communication system in which the plurality of electronic devices are located changes, the first electronic device sends a network change message to the second electronic device and re-determines a physical communication manner used when the first communication connection is established with the second electronic device.

In a possible design of the second aspect, when the computer instructions are executed by the processor, the electronic device is enabled to further perform the following steps: The first electronic device determines a wake-up period of the first electronic device based on a periodic connection established between a first application on the first electronic device and a cloud server of the first application, where the first application is any application on the first electronic device; and the first electronic device synchronizes the wake-up period to the second electronic device, where the wake-up period is the same as the first time period that is periodically set.

In a possible design of the second aspect, when the computer instructions are executed by the processor, the electronic device is enabled to further perform the following steps: The first electronic device displays a first interface in response to an operation of a user on a second application, where the first interface includes at least one electronic device that maintains the first communication connection with the first electronic device, and the at least one electronic device includes the second electronic device; and the first electronic device performs service communication with the second electronic device in response to an operation of the user on the second electronic device.

In a possible design of the second aspect, the first interface further includes at least one electronic device that is disconnected from the first electronic device.

In a possible design of the second aspect, the first interface further includes indication information. The indication information indicates that a third electronic device is being scanned. The third electronic device is a device that is in the plurality of electronic devices and is disconnected from the first electronic device; or the third electronic device is a device that establishes the first communication connection with the first electronic device for a first time.

In a possible design of the second aspect, the first electronic device includes a processor. The processor includes a plurality of processing cores. The plurality of processing cores include a low-power core. When the computer instructions are executed by the processor, the electronic device is enabled to further perform the following step: The first electronic device receives a packet sent by the second electronic device in the first time period by using the low-power core.

According to a third aspect, a communication system is provided, including a plurality of electronic devices. The plurality of electronic devices include a first electronic device and a second electronic device. The first electronic device is any electronic device in the plurality of electronic devices. The second electronic device is another electronic device other than the first electronic device in the plurality of electronic devices. The first electronic device is configured to perform the device networking method according to any one of the first aspect or the possible designs of the first aspect.

According to a fourth aspect, a computer-readable storage medium is provided, including computer instructions. When the computer instructions are run on an electronic device, the electronic device is enabled to perform the device networking method according to any one of the first aspect or the possible designs of the first aspect.

According to a fifth aspect, a computer program product is provided. The computer program product includes computer instructions. When the computer instructions are run on an electronic device, the electronic device is enabled to perform the device networking method according to any one of the first aspect or the possible designs of the first aspect.

It may be understood that, for beneficial effects that can be achieved by the electronic device according to any one of the second aspect and the possible designs of the second aspect, the communication system according to the third aspect, the computer-readable storage medium according to the fourth aspect, and the computer program product according to the fifth aspect, refer to the beneficial effects according to any one of the first aspect and the possible designs of the first aspect. Details are not described herein again.

BRIEF DESCRIPTION OF THE DRAWINGS

FIG. 10 is a schematic diagram of a structure of a communication system according to an embodiment of this application;

FIG. 11*a* is a schematic flowchart of a device networking method according to an embodiment of this application;

FIG. 11*b* is a schematic diagram of a relationship between a first time period and a second time period according to an embodiment of this application;

DETAILED DESCRIPTION OF ILLUSTRATIVE EMBODIMENTS

Figure 1:
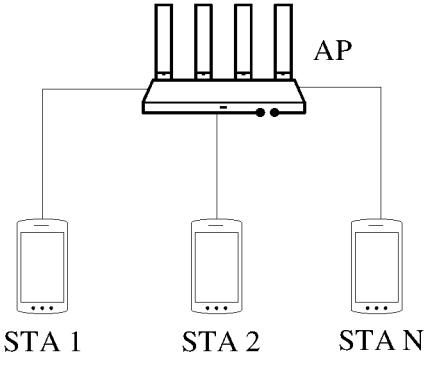
FIG. 1 is a schematic diagram of a structure of a network formed by an AP and a STA according to an embodiment of this application.

The following describes technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, unless otherwise specified, "a plurality of" means two or more than two. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the words such as "first" and "second" do not limit a quantity or an execution sequence, and the words such as "first" and "second" do not indicate a definite difference. In addition, in embodiments of this application, words such as "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, use of the words such as "example" or "for example" is intended to present a relative concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

A local area network of a star topology structure may be a network formed by a wireless access point (access point, AP) and a client (station, STA) in a wireless fidelity (wireless fidelity, Wi-Fi) communication manner, or may be a network formed by a master device (master) and a slave device (slave) in a classic Bluetooth (basic rate, BR)/ Bluetooth low energy (Bluetooth low energy, BLE) communication manner. In some embodiments, a network formed by an AP, a STA, and a cloud server and a network formed by a master device and a slave device may be referred to as a "vertical" network.

A networking process of the local area network of the star topology structure includes device discovery, device authentication, and device maintenance connection (keepalive for short). The device discovery means that a central device discovers a nearby peripheral device (or a peripheral device discovers a nearby central device). The device authentication means that the central device authenticates the discovered peripheral device. If the authentication succeeds, the central device may establish a connection with the peripheral device. The device maintenance connection means that service communication is performed between the central device and the peripheral device in a packet sending manner, so that the central device maintains a connection relationship with the peripheral device.

Figure 2:
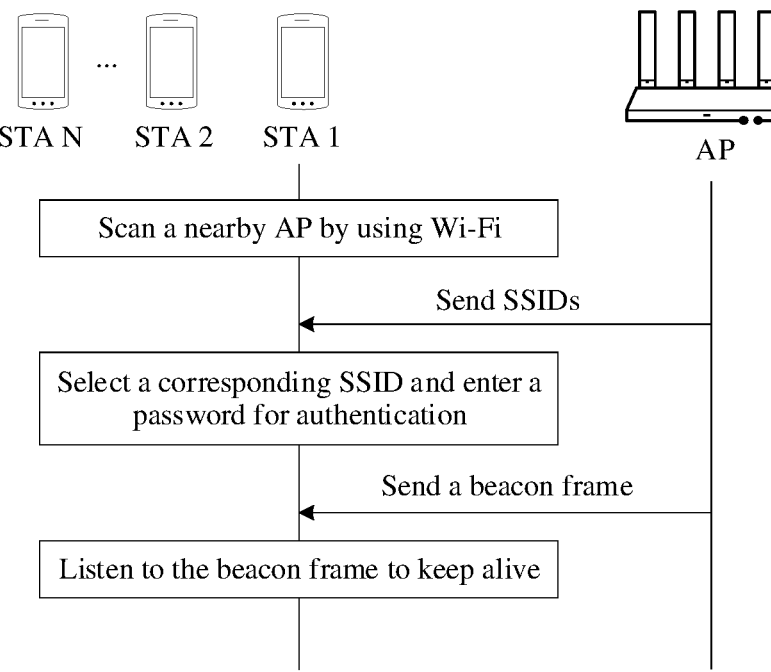
FIG. 2 is a schematic flowchart of a networking between an AP and a STA according to an embodiment of this application.

The network formed by the AP and the STA may be a wireless local area network (wireless local area network, WLAN). As shown in FIG. 1, a STA 1, a STA 2, . . . , and a STA N may establish a communication connection with an AP by using Wi-Fi. Then, the STA 1, the STA 2, . . . , and the STA N may perform service communication with the AP and access a remote cloud server through the AP. The AP may be a wireless router, or may be an electronic device having a Wi-Fi functional module. In FIG. 2, an example in which the AP is a wireless router is used for illustration.

With reference to FIG. 1, as shown in FIG. 2, a STA scans a nearby AP by using Wi-Fi. Then, the AP sends service set identifiers (service set identifiers, SSIDs) to the STA. After receiving the SSIDs sent by the AP, the STA selects a corresponding SSID and enters a password for authentication. If the authentication succeeds (that is, the password is correct), the STA negotiates a communication channel with the AP, and performs communication through the communication channel. Finally, the AP sends a beacon (beacon) frame to the STA, and the STA periodically listens to the beacon frame sent by the AP to keep alive. In some embodiments, a manner in which the STA shown in FIG. 2 discovers and connects the AP and keeps alive may also be referred to as a soft AP manner.

On the network formed by the AP and the STA shown in FIG. 2, when the AP and the STA keep alive, power consumption of the AP is relatively high. In addition, when two STAs need to perform service communication, the two STAs first need to perform mutual discovery and authentication. Then, service communication can be performed, resulting in a relatively high communication delay of the STA. Moreover, the AP and the STA can be networked only through the WLAN, and cannot be networked by using another communication medium.

Figure 3:
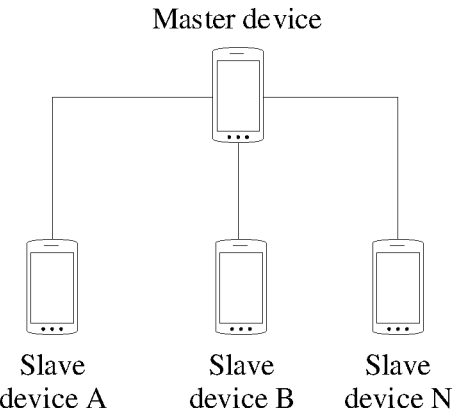
FIG. 3 is a schematic diagram of a structure of a network formed by a master device and a slave device according to an embodiment of this application.
Figure 4:
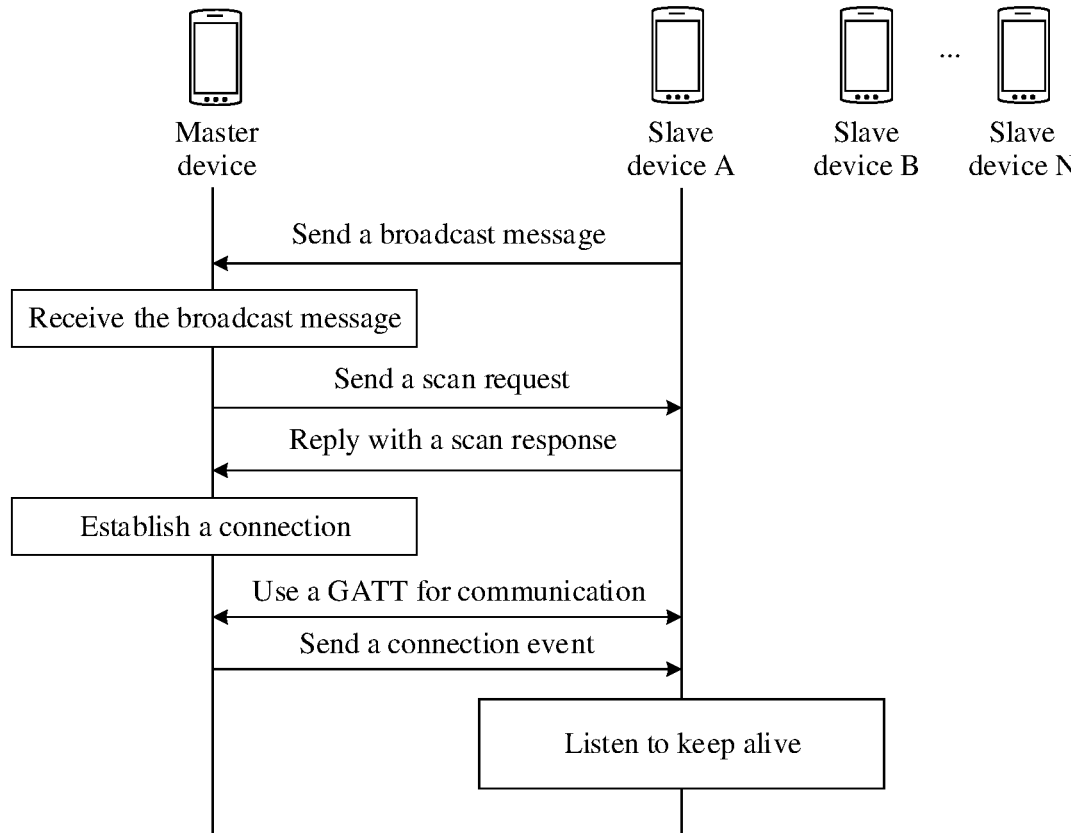
FIG. 4 is a schematic flowchart of a master/slave device networking according to an embodiment of this application.

As shown in FIG. 3, a slave device A, a slave device B, . . . , and a slave device N may establish a communication connection with a master device by using BLE/BR. Then, the slave device A, the slave device B, . . . , and the slave device N may perform service communication with the master device. With reference to FIG. 3, as shown in FIG. 4, a slave device may send a broadcast message (for example, ADV_IND or ADV_DIRECT_IND) on a broadcast channel. The broadcast message indicates that the slave device is in a connectable state. The master device may perform scanning on the broadcast channel. When receiving the broadcast message, that is, discovering the slave device, the master device sends a scan request (scan request) to the slave device. When receiving the scan request, the slave device replies with a scan response (scan response) to the master device that sends a connection request. The scan response replied by the slave device may be, for example, CONNEC-T_REQ. Then, the master device sends a connection request to the slave device. After the slave device receives the connection request, the master device and the slave device agree to establish a connection on a same channel and communicate with each other. For example, the master device and the slave device may use a generic attribute profile (generic attribute profile, GATT) for communication. When the master device and the slave device are networked in the BLE communication manner, in some embodiments, still as shown in FIG. 4, the master device periodically sends a connection event to the slave device, and the slave device periodically listens to the connection event sent by the master device to keep alive. In addition, when the master device and the slave device are networked in the BR communication manner, the master device and the slave device keep alive.

On the network formed by the master device and the slave device shown in FIG. 3, if the slave device A, the slave device B, . . . , the slave device N, and the master device include a plurality of devices of a same type, the plurality of devices of the same type are prone to mismatch. In addition, the slave devices cannot directly communicate with each other, and need to establish communication by using the remote cloud server. In addition, if communication media of the slave device A, the slave device B, . . . , the slave device N, and the master device are different, the slave devices and the master device cannot be networked.

It can be learned from the foregoing that, on the network formed by the AP and the STA or on the network formed by the master device and the slave device, when a central device does not exist (for example, the device is not powered on, or the device is damaged), the network does not exist. As a result, peripheral devices cannot communicate with each other. When the central device exists (for example, works properly) and the network formed by the peripheral devices and the central device exists, the central device located on the local area network of the star topology structure can perform service communication with the peripheral devices, but the peripheral devices cannot directly perform service communication with each other. For example, in a Wi-Fi networking (that is, AP and STA networking) scenario, the STA 1 and the STA 2 cannot directly perform service communication. In a Bluetooth networking (that is, slave/master device networking) scenario, the slave device A and the slave device B cannot directly perform service communication. Further, each time a peripheral device attempts to perform service communication with another peripheral device (for example, the STA 1 and the STA 2, and the slave device A and the slave device B), the peripheral devices need to perform mutual discovery. To be specific, the peripheral devices need to first perform mutual scanning or discovery before negotiating communication. In this case, a communication delay between the peripheral device and the another peripheral device is uncontrollable. If a user has a communication requirement when using a communication application, the user may need to wait for a long time (seconds or even minutes), which reduces user experience.

Figure 5:
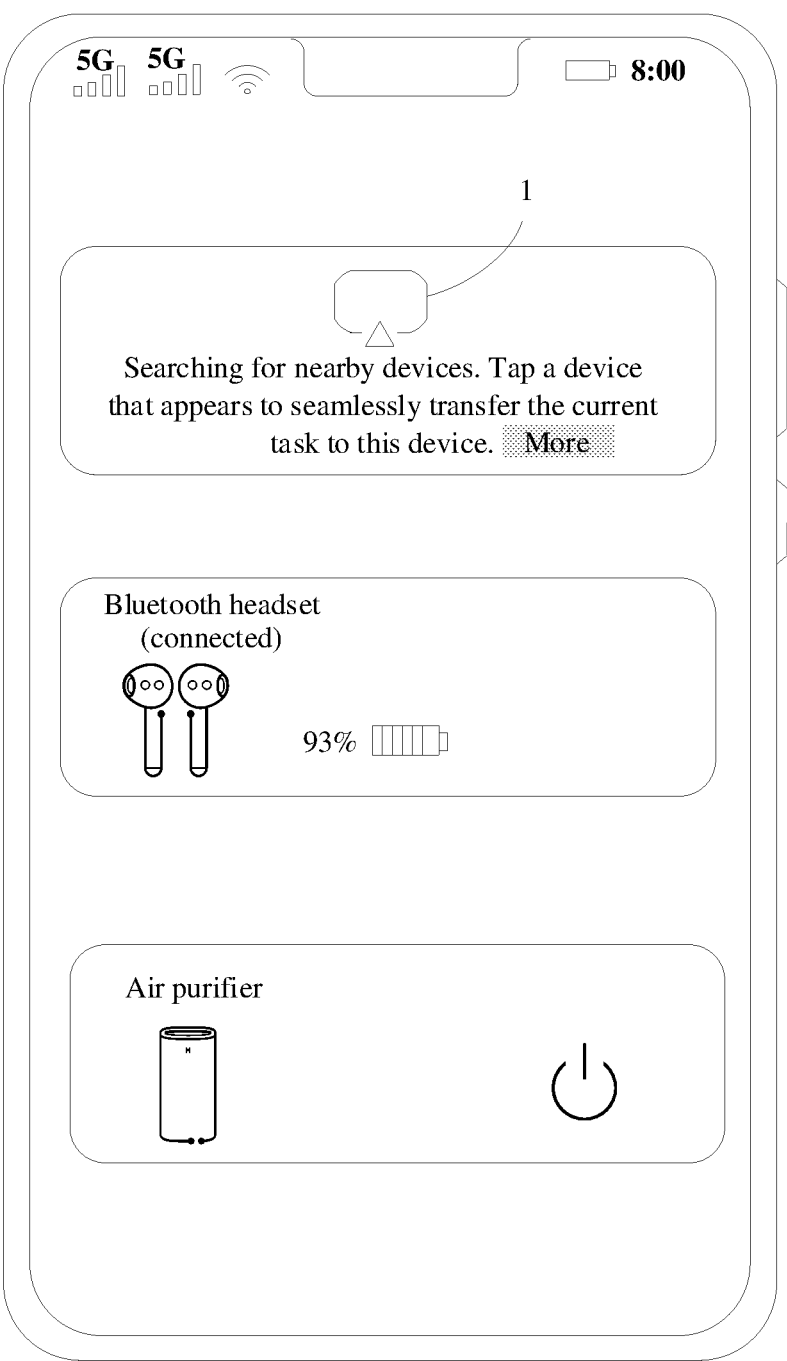
FIG. 5 is a schematic diagram of an interface of a mobile phone according to an embodiment of this application.

A mobile phone is used as an example. As shown in FIG. 5, when a user holds the mobile phone and needs to turn on a television, a scan control 1 is displayed on a screen of the mobile phone. After the user taps the scan control 1, the mobile phone starts to perform a handshake connection with a nearby online device (that is, the mobile phone starts to scan the nearby online device). After a period of scanning, an interface of the mobile phone displays a device that completes a handshake connection with the mobile phone. After the user taps any device (for example, a computer) in the interface of the mobile phone, the mobile phone may perform service communication with the device. It can be learned that, when the mobile phone scans the nearby online device, the user needs to wait for a long time, which reduces user experience.

It should be noted that, in FIG. 5, the interface displayed by the mobile phone further includes a device (for example, a Bluetooth headset and an air purifier) that is performing service communication with the mobile phone.

On this basis, an embodiment of this application provides a device networking method, which is applied to a communication network. The communication network does not depend on a general-purpose network formed by the AP and STA or a star network formed by the master device and the slave device. The method may enable a plurality of electronic devices to automatically form a communication network (ad hoc network for short). To be specific, any two electronic devices in the plurality of electronic devices may perform mutual discovery and authentication, and establish a persistent connection. The persistent connection is a periodic handshake connection (which may also be referred to as handshake keepalive). In this way, on the ad hoc network, any two electronic devices in the plurality of electronic devices may perform service communication. In addition, because any two electronic devices in the plurality of electronic devices periodically perform the handshake connection, that is, each electronic device may know in advance which online devices are around, two electronic devices that need to perform service communication may directly perform service communication, without first performing mutual discovery and authentication and then performing service communication. Therefore, a discovery and authentication phase of devices in a communication phase is omitted, uncertainty of mutual discovery and authentication of devices is reduced, communication reliability is improved while a communication delay is reduced, and user experience is improved.

For example, a software bus is disposed in devices, so that an ad hoc network is formed between the devices. The software bus has a discovery and connection capability, may provide a high-throughput, low-latency, high-reliability, secure, and reliable communication channel between electronic devices, and provide a distributed smart communication highway network with a wireless near-localized access effect between the electronic devices. After the software bus is disposed in an electronic device, the electronic device has a capability of discovering and being discovered.

It should be noted that, in embodiments of this application, the ad hoc network formed by the plurality of electronic devices may be an ad hoc network between a plurality of peripheral devices, or may be an ad hoc network between the central device and a plurality of peripheral devices. For example, the ad hoc network is formed between the STA 1, the STA 2, . . . , and the STA N; or the ad hoc network is formed between the slave device A, the slave device B, . . . , the slave device N, and the master device. In addition, in this application, a new network formed by the plurality of electronic devices is also referred to as a "horizontal" network. The "horizontal" network is a network that is automatically formed with each other by the electronic devices without depending on a remote cloud server. For example, the ad hoc network formed by the plurality of electronic devices may be an ad hoc network between devices whose communication roles are peer to peer, for example, between peer devices (STAs) having an AP-STA "vertical" network, or between peer devices (slave) having a master-slave "vertical" network; or a network that is mutually networked between role-free isolated peer devices with a communication capability when there is no existing AP-STA network or master-slave network.

Before embodiments of this application are described, an application scenario of embodiments of this application is first described.

The device networking method provided in embodiments of this application may be applied to different fields (for example, the 1+8+N consumer goods field and the industrial device field). "1" refers to a mobile phone. "8" refers to a head unit, a speaker, a headset, a watch/band, a tablet, a large screen, a personal computer (personal computer, PC), an augmented reality (augmented reality, AR) device/virtual reality (virtual reality, VR) device, or the like. "N" refers to an internet of things (internet of things, IoT) device.

On this basis, an application scenario to which the method is applicable includes but is not limited to: an office scenario, a sports scenario, a home scenario, an entertainment scenario, an education scenario, an industrial production scenario, and the like. It should be noted that the plurality of electronic devices may form a "super terminal" in different scenarios, and electronic devices in the "super terminal" may be interworked for cooperative work. For example, when the plurality of electronic devices form a "super terminal", an electronic device (for example, a television, a router, or a mobile phone) may be determined as a central control device, and each electronic device other than the central control device may be used as a slave device to establish a communication connection (for example, a Bluetooth connection or a Wi-Fi connection) with the central control device. In this way, the central control device, as a central node, may be configured to manage and control another slave device to complete corresponding work. In some embodiments, a user may install an application (application, APP) on the central control device, and the user may operate, in the app of the central control device, a slave device connected to the central control device, thereby greatly improving user experience.

It should be noted that the central control device may be, for example, a rich device, and the slave device may be, for example, a thin device. Usually, a priority of a rich device is higher than that of a thin device. For example, the rich device is a device with strong central processing unit (central processing unit, CPU), memory, hard disk, and network capabilities. The thin device is a device with weak CPU, memory, hard disk, and network capabilities. For example, the rich device may be a mobile phone, a tablet computer (PAD), a personal computer (personal computer, PC), or a smart screen. The thin device may be, for example, a smartwatch, a headset, or smart glasses. This is not limited in this application.

Figure 6:
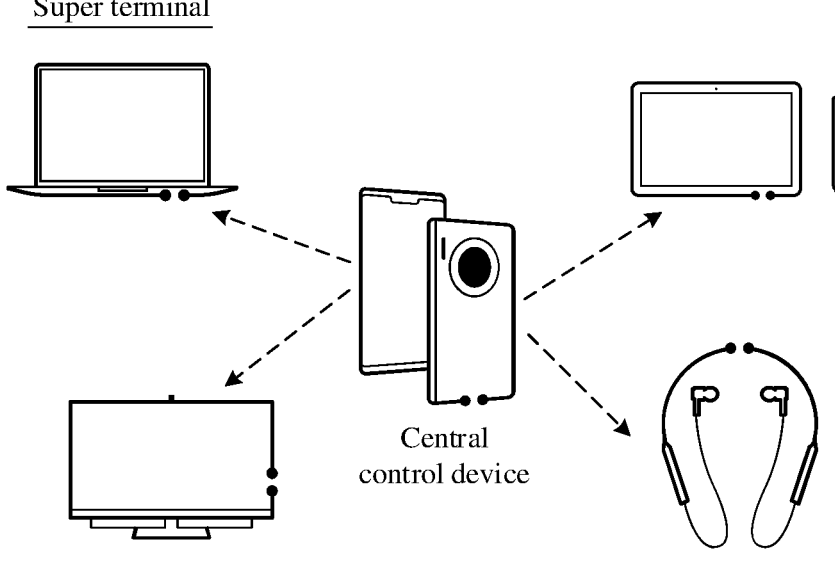
FIG. 6 is a schematic diagram of a structure of a super terminal according to an embodiment of this application.

In some embodiments, as shown in FIG. 6, a mobile phone of a rich device is selected as the central control device. On this basis, the user can operate the television, the tablet, the computer, and a wireless Bluetooth headset on the app installed on the mobile phone. For example, the user may turn on the television by using the installed app on the mobile phone.

Figure 7:
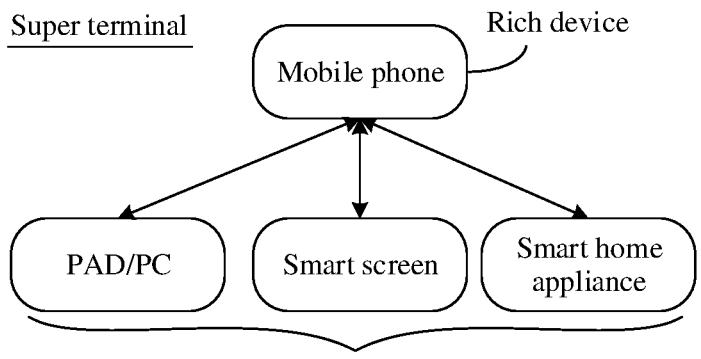
FIG. 7 is a schematic diagram of a structure of another super terminal according to an embodiment of this application.
Figure 8:
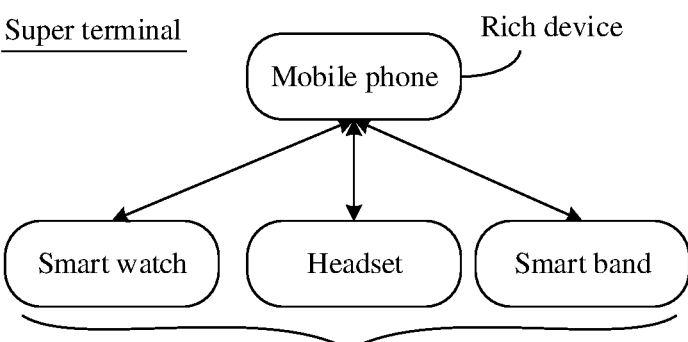
FIG. 8 is a schematic diagram of a structure of still another super terminal according to an embodiment of this application.

It should be understood that, in different scenarios, electronic devices that form the "super terminal" are different. For example, in the home scenario, as shown in FIG. 7, the electronic devices that form the "super terminal" include a mobile phone, a tablet computer (PAD)/personal computer (personal computer, PC), a smart screen, and a smart home appliance (for example, a smart lamp, a smart switch, a smart refrigerator, a smart oven, a smart lock, and a smart curtain). For example, the mobile phone is used as a rich device. The PAD/PC, the smart screen, and the smart home appliance establish a connection with the mobile phone by using an access technology (for example, Wi-Fi, Bluetooth, USB, or Ethernet). Then, the user only needs to operate the mobile phone to control another device in real time. For example, the user may operate the mobile phone to turn on (or turn off) the smart lamp, the smart switch, and the like. For another example, in the sports scenario, as shown in FIG. 8, the electronic devices that form the "super terminal" include a mobile phone, a smartwatch, a headset, a smart band, and the like. For example, the mobile phone is a rich device. The smartwatch, the headset, and the smart band establish a connection with the mobile phone by using an access technology (for example, Wi-Fi, Bluetooth, USB, or Ethernet). Then, the user only needs to operate the mobile phone to control another device in real time. For example, the user may operate the mobile phone to turn on the headset, so that the user can listen to music (or make a call) by using the headset.

For example, the device networking method provided in an embodiment of this application may be applied to the electronic device, like the mobile phone, the tablet, the personal computer (personal computer, PC), a personal digital assistant (personal digital assistant, PDA), the smartwatch, a netbook, a wearable electronic device, the augmented reality (augmented reality, AR) device, the virtual reality (virtual reality, VR) device, a vehicle-mounted device, a smart vehicle, or a smart speaker. This is not limited in embodiments of this application.

Figure 9:
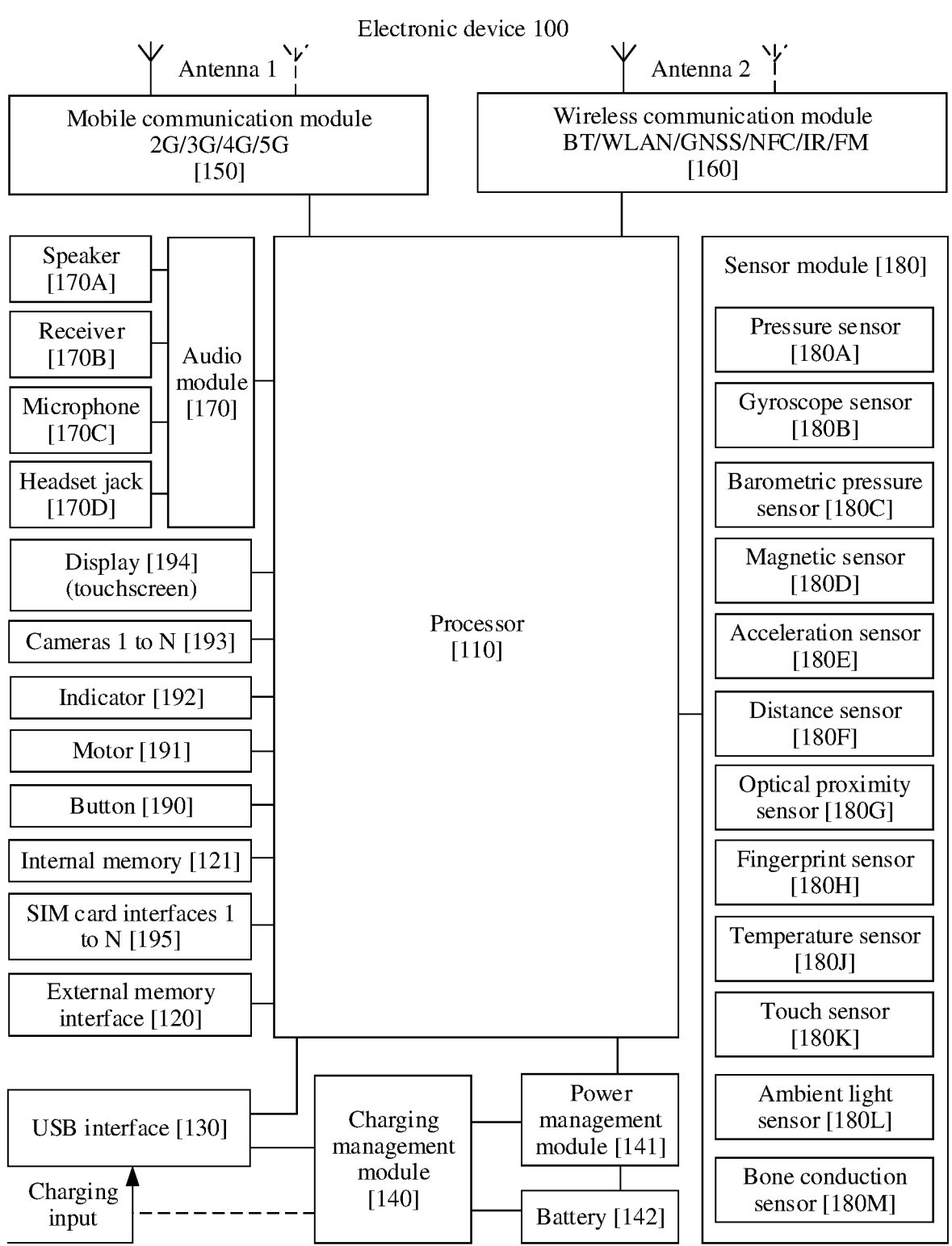
FIG. 9 is a schematic diagram of a structure of an electronic device according to an embodiment of this application.

FIG. 9 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identity module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to implement control on instruction fetching and execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is only an example for description, and does not constitute a limitation on the structure of the electronic device. In some other embodiments, the electronic device may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health state (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution applied to the electronic device 100 for wireless communication including 2G, 3G, 4G, 5G, and the like. The mobile communication module 150 may include at least one filter, a switch, a power amplifier, a low-noise amplifier (low-noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation.

The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device with at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device with the mobile communication module 150 or another functional module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like.

The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code-division multiple access (code-division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format like RGB or YUV. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transformation and the like on frequency energy.

The video codec is configured to compress or decompress a digital video. The electronic device 100 may support one or more types of video codecs. In this way, the electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, and quickly processes input information based on a structure of a biological neural network, for example, based on a transfer mode between human brain neurons; and may further continuously perform self-learning. The NPU can implement applications such as intelligent cognition of the electronic device, for example, image recognition, facial recognition, voice recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. For example, in an embodiment of this application, the processor 110 may execute the instructions stored in the internal memory 121, and the internal memory 121 may include a program storage area and a data storage area.

The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, or may include a non-volatile memory, for example, at least one magnetic disk storage device, a flash memory, or a universal flash storage (universal flash storage, UFS).

The electronic device 100 may use the audio module 170, the speaker 170A, the receiver 170B, the microphone 170C, the headset jack 170D, the application processor, and the like to implement an audio function, for example, music playing and recording.

The audio module 170 is configured to convert digital audio information into an analog audio signal for output, and is also configured to convert an analog audio input into a digital audio signal. The audio module 170 may be configured to encode and decode an audio signal. In some embodiments, the audio module 170 may be disposed in the processor 110, or some functional modules of the audio module 170 are disposed in the processor 110. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal.

The headset jack 170D is configured to connect to a wired headset. The headset jack 170D may be the USB interface 130, or may be a 3.5 mm open mobile electronic terminal 100 platform (open mobile terminal platform, OMTP) standard interface or a cellular telecommunications industry association of the USA (cellular telecommunications industry association of the USA, CTIA) standard interface.

The button 190 includes a power button, a volume button, and the like. The button 190 may be a mechanical button, or may be a touch-sensitive button. The motor 191 may generate a vibration prompt. The motor 191 may be configured to provide an incoming call vibration prompt or a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like.

With reference to the accompanying drawings in this specification, the following specifically describes a device networking method provided in an embodiment of this application.

The device networking method provided in this embodiment of this application is applied to a communication system 200. As shown in FIG. 10, the communication system 200 includes a plurality of electronic devices (for example, a mobile phone, a headset, a smart screen, a band, and a tablet). The plurality of electronic devices may perform mutual discovery and mutual authentication. If the authentication succeeds, any two electronic devices in the plurality of electronic devices may establish a communication connection (for example, a first communication connection) with each other and keep alive, to complete a networking process of the communication system 200.

The plurality of electronic devices may specifically include a first electronic device and a second electronic device. The first electronic device is any electronic device in the plurality of electronic devices. The second electronic device is another electronic device other than the first electronic device in the plurality of electronic devices. For example, the plurality of electronic devices include a device 1, a device 2, and a device 3. For example, the first electronic device may be the device 1, and the second electronic device may be the device 2; or the first electronic device is the device 2, and the second electronic device is the device 3; or the first electronic device is the device 3, and the second electronic device is the device 2; or the first electronic device and the second electronic device may be a combination of any two of the device 1, the device 2, and the device 3. This is not limited in embodiments of this application.

The first electronic device has a capability of discovering the second electronic device, and the first electronic device may on the contrary be discovered by the second electronic device. Likewise, the second electronic device has a capability of discovering the first electronic device, and the second electronic device may on the contrary be discovered by the first electronic device. On this basis, the first electronic device and the second electronic device that are mutually discovered may perform authentication. If the authentication succeeds, the first electronic device establishes a communication connection with the second electronic device.

For example, the first electronic device may establish a communication connection with the second electronic device in at least two physical communication manners. The at least two physical communication manners may include a first communication manner and a second communication manner. To be specific, the first electronic device and the second electronic device are connected in the first communication manner and in the second communication manner. The at least two physical communication manners may be a connected physical-layer communication manner, or may be a non-connected physical-layer communication manner. The connected physical-layer communication manner may be, for example, a Wi-Fi connection or another physical-layer connection manner. The non-connected physical-layer communication manner may be, for example, a Bluetooth (BR, BLE, or the like) connection manner, a network port connection manner, or another physical connection manner. This is not limited in this application.

Figure 11C:
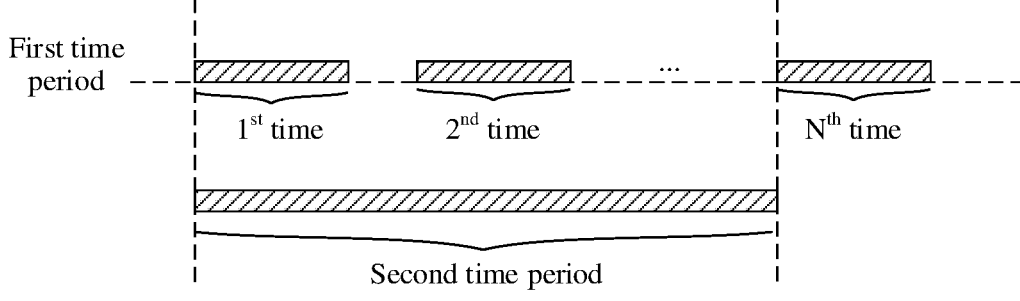
FIG. 11*c* is a schematic diagram of another relationship between a first time period and a second time period according to an embodiment of this application.

FIG. 11*a* is a schematic flowchart of a device networking method according to an embodiment of this application. As shown in FIG. 11*a*, the method includes the following steps.

S10: The first electronic device sends a discovery message to the second electronic device.

The discovery message indicates that the first electronic device can be discovered by another electronic device.

At the same time, the second electronic device scans a nearby device. When the second electronic device receives the discovery message sent by the first electronic device, the second electronic device discovers the first electronic device by scanning.

Likewise, the second electronic device sends a discovery message to the first electronic device. At the same time, the first electronic device scans a nearby device. When the first electronic device receives the discovery message sent by the second electronic device, the first electronic device discovers the second electronic device by scanning.

It can be learned that the first electronic device and the second electronic device each may be used as a sender device to send the discovery message, or may be used as a scanner device to perform scanning. In this way, both the first electronic device and the second electronic device have a capability of discovering and being discovered. Likewise, each electronic device in the plurality of electronic devices has a capability of discovering and being discovered.

S20: The first electronic device sends an authentication message to the second electronic device.

The authentication message indicates device information of the first electronic device. The device information includes an SSID, account information, a communication medium (which may also be referred to as a communication manner), and the like of the first electronic device.

The SSID indicates a name (for example, Huawei P30) of the first electronic device. The account information indicates account information (for example, a mobile number or an email address of a user) of the user who uses the first electronic device. The communication medium indicates a line used when the first electronic device performs network communication. For example, the communication medium includes but is not limited to the following several types: a wireless local area network (wireless local area network, WLAN), a peer-to-peer (peer-to-peer, P2P) network, BR, BLE, and power line communication (power line communication, PLC).

Likewise, the second electronic device sends an authentication message to the first electronic device. For the authentication message sent by the second electronic device, refer to the foregoing example of the authentication message sent by the first electronic device, and details are not described herein again.

After the first electronic device and the second electronic device exchange device information with each other, the first electronic device performs authentication based on the device information sent by the second electronic device. At the same time, the second electronic device performs authentication based on the device information sent by the first electronic device. If SSIDs of the first electronic device and the second electronic device are the same, the first electronic device automatically establishes a communication connection with the second electronic device. For example, when the first electronic device is a Huawei P30 model and the second electronic device is a Huawei MAX model, the first electronic device automatically establishes a communication connection with the second electronic device. If the SSIDs of the first electronic device and the second electronic device are different, the first electronic device establishes a communication connection with the second electronic device through user authorization. For example, the user may select the SSID of the second electronic device from the first electronic device and enter a password, so that the first electronic device establishes a communication connection with the second electronic device. If the account information of the first electronic device is the same as that of the second electronic device, that is, the first electronic device and the second electronic device are devices belonging to a same user, the first electronic device may directly establish a communication connection with the second electronic device.

For example, the first electronic device may establish the communication connection with the second electronic device in the at least two physical communication manners (for example, a first communication manner and a second communication manner) described in the foregoing embodiment. For examples of the at least two physical communication manners, refer to the foregoing embodiment. Details are not described herein again.

S30: The first electronic device establishes a persistent connection with the second electronic device.

Establishing the persistent connection specifically means that the first electronic device maintains the first communication connection with the second electronic device.

For example, the first electronic device and the second electronic device may periodically trigger a heartbeat inquiry, so that the first electronic device can maintain a state of the persistent connection with the second electronic device. The persistent connection is a regular and rhythmic (namely, periodic) discovery or connection means. In this application, the persistent connection is applied to various connected and non-connected physical-layer communication manners. For example, the connected physical-layer communication manner may be, for example, a Wi-Fi connection, and the non-connected physical-layer communication manner may be, for example, a Bluetooth connection, a network port connection, or the like. Certainly, the connected and non-connected physical-layer communication manners may alternatively be other connection manners. This is not limited in this application. For example, the first electronic device may maintain a persistent connection with the second electronic device in the first communication manner and in the second communication manner. The first communication manner and the second communication manner are not limited to a manner of maintaining a connection conventionally defined according to a communication protocol of a physical communication manner thereof, and may also be a manner of storing only connection information. The connection information is used to quickly resume the persistent connection established in the physical communication manner, or quickly perform a persistent connection in the physical communication manner. For example, the connection information may be, for example, a related parameter or related information (for example, information about a peer device) required for establishing and resuming the connection.

For example, when the first electronic device establishes a communication connection with the second electronic device in a BLE communication manner, the first electronic device may establish a persistent connection with the second electronic device by using an advertisement (advertisement) frame of the BLE. For another example, when the first electronic device establishes a communication connection with the second electronic device in a BR communication manner, the BR maintains a persistent connection between the first electronic device and the second electronic device. For another example, when the first electronic device establishes a communication connection with the second electronic device in a communication manner like a USB, an Ethernet, a WLAN, or PLC, and the first electronic device performs service communication with the second electronic device by using a user datagram protocol (user datagram protocol, UDP), the first electronic device may establish a persistent connection with the second electronic device by using a non-connected internet of things protocol (constrained application protocol, CoAP) packet. For another example, when the first electronic device establishes a communication connection with the second electronic device in a communication manner like a USB, an Ethernet, a WLAN, or PLC, and the first electronic device performs service communication with the second electronic device by using an IP, the first electronic device may establish a persistent connection with the second electronic device by using a transmission control protocol (transmission control protocol, TCP) and maintain the persistent connection by using a keepalive (keepalive) mechanism. For another example, when the first electronic device establishes a communication connection with the second electronic device in a P2P manner, the P2P directly enables the first electronic device and the second electronic device to establish a persistent connection.

That the first electronic device and the second electronic device periodically trigger the heartbeat inquiry indicates: The first electronic device receives a packet sent by the second electronic device, in the first communication manner in a first time period; and then the first electronic device determines, based on the packet, that the first communication connection with the second electronic device is valid in a second time period. It should be noted that the packet that is sent by the second electronic device and that is received by the first electronic device in the first communication manner in the first time period may be a packet in various forms (for example, a response packet, an inquiry packet, or a service packet).

In some embodiments, the first time period is periodically set. A length of the first time period may remain unchanged, or may dynamically change (for example, increase or decrease). In the first time period that is periodically set, an interval between two adjacent first time periods is from a current start to a next start, or from a current end to a next end. This is not limited in this application.

Figure 11D:
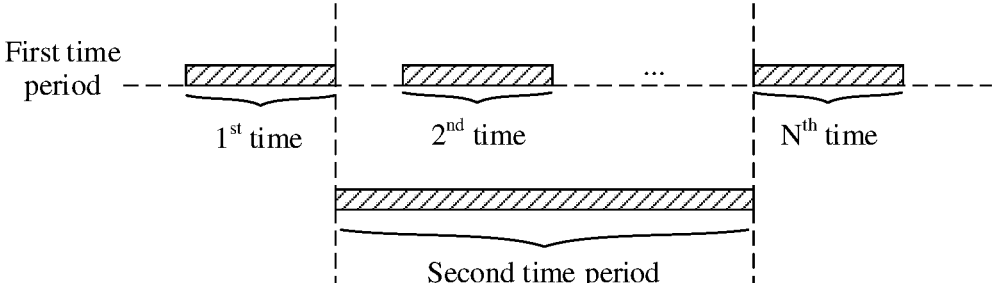
FIG. 11*d* is a schematic diagram of still another relationship between a first time period and a second time period according to an embodiment of this application.

In some embodiments, as shown in FIG. 11$b$, a start moment of the second time period is the same as a moment when the first electronic device receives the packet, and an end moment of the second time period is a time period after the first electronic device receives the packet. For example, the end moment of the second time period is greater than or equal to a start moment (or an end moment) of an $N^{th}$ first time period. FIG. 11$b$ shows an example in which the end moment of the second time period is equal to the start moment of the $N^{th}$ first time period.

In some other embodiments, as shown in FIG. 11$c$, the start moment of the second time period is the same as a start moment of a current first time period (for example, the first time period for a first time), and the end moment of the second time period is a time period after the start moment of the current first time period. For example, the end moment of the second time period is greater than or equal to the start moment (or the end moment) of the $N^{th}$ first time period.

FIG. 11$c$ shows an example in which the end moment of the second time period is equal to the start moment of the $N^{th}$ first time period.

In still other embodiments, as shown in FIG. 11$d$, the start moment of the second time period is the same as an end moment of the current first time period (for example, the first time period for the first time), and the end moment of the second time period is a time period after the end moment of the current first time period. For example, the end moment of the second time period is greater than or equal to the start moment (or the end moment) of the $N^{th}$ first time period. FIG. 11$d$ shows an example in which the end moment of the second time period is equal to the start moment of the $N^{th}$ first time period.

When the first electronic device determines, based on the packet, that the first communication connection with the second electronic device is valid in the second time period, the first electronic device performs service communication with the second electronic device in the second communication manner in the second time period. For example, the first electronic device may quickly resume, based on stored connection information, the first communication connection established with the second electronic device, and perform service communication.

In some embodiments, the first time period is periodically set. It is assumed that the first time period is a first time period set for a first time. The method further includes: When the first electronic device does not receive a packet in the first time period that is a first time period set for a second time, the first electronic device determines to be disconnected from the second electronic device; or when the first electronic device does not receive a packet in the first time periods that are a first time period set for N (N>1) consecutive times, the first electronic device determines to be disconnected from the second electronic device; or when the first time period and the second time period at least partially overlap and the first electronic device does not receive a packet in a first time period within the second time period, the first electronic device determines to be disconnected from the second electronic device.

On this basis, when the first electronic device performs service communication again with the second electronic device, the first electronic device re-establishes the first communication connection with the second electronic device.

It should be noted that, that the first electronic device re-establishes the first communication connection with the second electronic device indicates that the first electronic device and the second electronic device perform mutual scanning and discovery again, and then perform mutual authentication. If the authentication succeeds, the first electronic device re-establishes the first communication connection with the second electronic device. Different from that the first electronic device resumes the first communication connection established with the second electronic device, that the first electronic device resumes the first communication connection established with the second electronic device indicates that the first electronic device and the second electronic device do not need to perform a process of mutual scanning, mutual discovery, and mutual authentication, but the first electronic device sends a request packet, and receives a packet replied by the second electronic device, so as to resume the first communication connection. To be specific, that the first electronic device resumes the first communication connection with the second electronic device may be understood as that the first communication connection established between the first electronic device and the second electronic device exists, and the first communication connection (that is, keepalive) is maintained in a manner of receiving a packet in the first time period.

In some embodiments, the plurality of electronic devices each serve as a sender device to send a handshake request message (for example, send a request packet), and the plurality of electronic devices each serve as a receiver device to reply with a handshake response message (for example, reply with a packet). In some other embodiments, the plurality of electronic devices each serve as a broadcaster device to broadcast a handshake response message. In still other embodiments, through negotiation, one electronic device in the plurality of electronic devices is used as a master device, and another device other than the master device in the plurality of electronic devices is used as a slave device. On this basis, the master device may send a handshake request message to each slave device, and then each slave device replies with a handshake response message to the master device.

It should be noted that the first electronic device is any electronic device in the plurality of electronic devices, the second electronic device is any electronic device other than the first electronic device in the plurality of electronic devices, and that the first electronic device establishes the persistent connection with the second electronic device indicates that the persistent connection may be established between any two electronic devices in the plurality of electronic devices. On this basis, with reference to FIG. 12, FIG. 13, and FIG. 14, a process of establishing the persistent connection between any two electronic devices in the plurality of electronic devices is described in detail.

Figure 12:
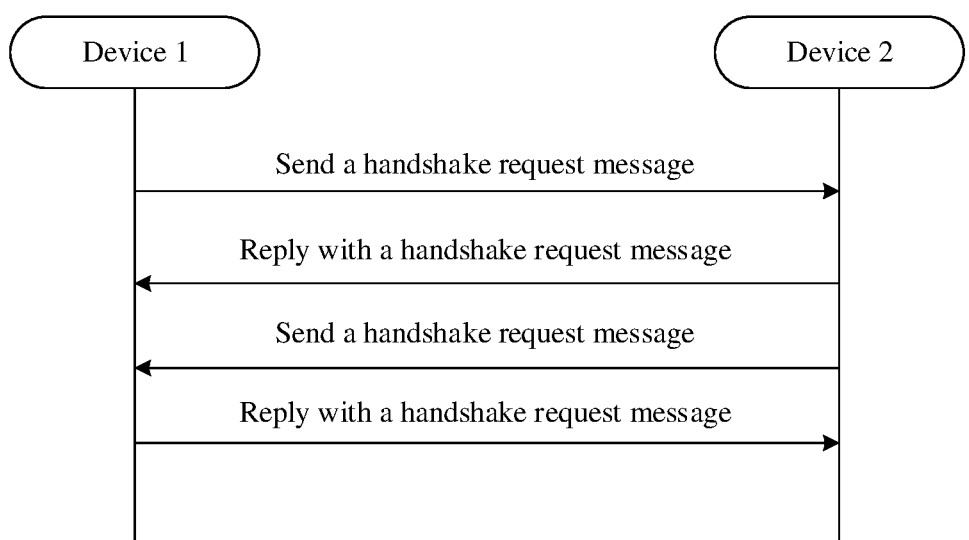
FIG. 12 is a schematic flowchart of a device handshake connection according to an embodiment of this application.

In some embodiments, for example, the plurality of electronic devices include a device 1 and a device 2. As shown in FIG. 12, the device 1 sends a handshake request message to the device 2, and the device 2 replies with a handshake response message to the device 1. Likewise, the device 2 sends a handshake request message to the device 1, and the device 1 replies with a handshake response message to the device 2.

The handshake request message may be, for example, "whether online". When the device 1 sends the handshake request message to the device 2, the device 1 queries whether the device 2 is online. Then, the device 2 detects a network adapter status of the device 2. When the network adapter of the device 2 is in a connected state, the device 2 replies with a handshake response message, that is, the device 2 replies with "online". When the network adapter of the device 2 is in a disconnected state, the device 2 does not reply with a handshake response message, that is, the device 2 is "offline". In this way, the device 1 and the device 2 send the handshake request message and reply with the handshake response message, so that the device 1 and the device 2 know that each other is "online", further enabling the device 1 and the device 2 to complete a handshake connection.

It should be noted that "online" indicates that the electronic device is within a coverage range of a communication network (or the electronic device is connected to the communication network), has a communication capability, and can perform communication. "Offline" indicates that the electronic device is not within the coverage range of the communication network (or the electronic device is disconnected from the communication network), and cannot perform communication.

In this embodiment, each electronic device in the plurality of electronic devices sends a handshake request message. When each electronic device in the plurality of electronic devices replies with a handshake response message, every two electronic devices in the plurality of electronic devices complete a handshake connection with each other. It should be noted that the handshake response message may be, for example, an inquiry packet. That the device 1 and the device 2 complete the handshake connection is that the device 1 determines, based on a packet (for example, an inquiry packet), that the first communication connection with the device 2 is valid in the second time period. On this basis, the device 1 may directly perform service communication with the device 2.

Figures 13, 14:
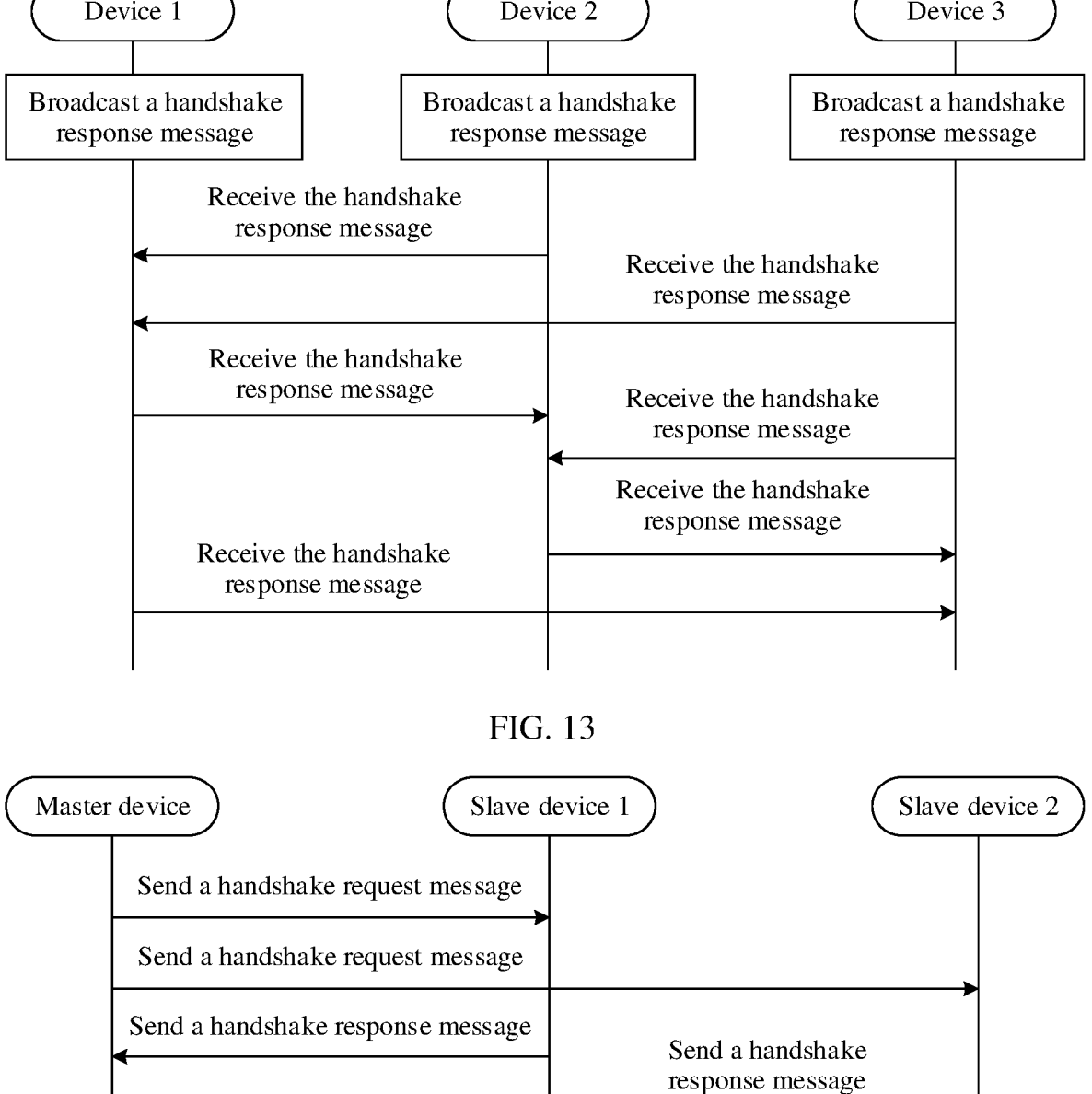
FIG. 13 is a schematic flowchart of another device handshake connection according to an embodiment of this application.
FIG. 14 is a schematic flowchart of still another device handshake connection according to an embodiment of this application.

In some other embodiments, each electronic device in the plurality of electronic devices broadcasts a handshake response message. Then, the first electronic device receives a handshake response message broadcast by another electronic device other than the first electronic device. For example, the plurality of electronic devices include a device 1, a device 2, and a device 3. For example, as shown in FIG. 13, the device 1 broadcasts a handshake response message, the device 2 broadcasts a handshake response message, and the device 3 broadcasts a handshake response message. On this basis, the device 1 receives the handshake response messages broadcast by the device 2 and the device 3, the device 2 receives the handshake response messages broadcast by the device 1 and the device 3, and the device 3 receives the handshake response messages broadcast by the device 1 and the device 2. In this way, the device 1, the device 2, and the device 3 can complete a handshake connection with each other.

It should be noted that, for an example of a corresponding handshake response message, refer to the foregoing embodiment, and details are not described herein again. It should be understood that when the electronic device broadcasts the handshake response message, it indicates that the electronic device is "online". When the electronic device does not broadcast the handshake response message, it indicates that the electronic device is "offline".

In this embodiment, if each electronic device in the plurality of electronic devices broadcasts a handshake response message, it indicates that each electronic device is "online". Then, each electronic device may receive a handshake response message broadcast by another electronic device other than the electronic device, so that a handshake connection is completed between every two electronic devices in the plurality of electronic devices. It should be noted that the handshake response message may be, for example, a response packet (acknowledge character, ACK). For example, that the device 1 and the device 2 complete the handshake connection is that the device 1 determines, based on a packet (for example, a response packet), that the first communication connection with the device 2 is valid in the second time period. On this basis, the device 1 may directly perform service communication with the device 2.

In still other embodiments, the plurality of electronic devices determine one master device through negotiation, and other electronic devices other than the master device are used as slave devices. For example, the plurality of electronic devices include a master device, a slave device 1, and a slave device 2. For example, as shown in FIG. 14, the master device sends a handshake request message to the slave device 1, and the master device 1 sends a handshake request message to the slave device 2. Then, after the slave device 1 and the slave device 2 receive the handshake request message sent by the master device, the slave device 1 sends a handshake response message to the master device, and the slave device 2 sends a handshake response message to the master device.

It should be noted that, for examples of the handshake request message and the handshake response message, refer to the foregoing embodiment, and details are not described herein again. When the slave device replies with a handshake response message to the master device, it indicates that the slave device is "online". When the slave device does not reply with a handshake response message to the master device, it indicates that the slave device is "offline".

In this embodiment, if all slave devices in the plurality of electronic devices reply with handshake response messages to the master device, it indicates that all the slave devices are "online". Then, all the slave devices may complete handshake connections with the master device. It should be noted that the handshake response message may be, for example, a response packet. For example, that the device 1 and the device 2 complete the handshake connection is that the device 1 determines, based on a packet (for example, a response packet), that the first communication connection with the device 2 is valid in the second time period. On this basis, the device 1 may directly perform service communication with the device 2.

In addition, the plurality of electronic devices determine one master device through negotiation. For example, an electronic device with a highest priority in the plurality of electronic devices may be determined as the master device, or one master device may be determined in another manner. This is not limited in this application. The priority indicates hardware performance of a device. Hardware performance of a device with a high priority is higher than hardware performance of a device with a low priority. The hardware performance includes one or more of processor performance, memory performance, hard disk performance, or a network capability. For example, processor performance (for example, a CPU clock speed), hard disk performance, or a network capability of a device with a high priority is higher than processor performance (for example, a CPU clock speed), hard disk performance, or a network capability of a device with a low priority.

In some embodiments, in a process in which the first electronic device establishes the first communication connection with the second electronic device, the first electronic device determines a priority of the second electronic device. At the same time, in the process in which the first electronic device establishes the first communication connection with the second electronic device, the second electronic device determines a priority of the first electronic device. When the first electronic device determines that the priority of the first electronic device is higher than that of the second electronic device, the first electronic device determines, based on the packet, that the first communication connection with the second electronic device is valid in the second time period. To be specific, the first electronic device with a higher priority is used to send the request packet and receive the packet.

It should be noted that, when the first electronic device is performing service communication (for example, in the BR, the BLE, or the P2P manner) with the second electronic device, the first electronic device may receive a service packet sent by the second electronic device to determine that the first communication connection with the second electronic device is valid in the second time period.

Based on the foregoing description, in embodiments of this application, the plurality of electronic devices automatically form the communication network (ad hoc network for short). To be specific, any two electronic devices in the plurality of electronic devices may perform mutual discovery and authentication, and establish the persistent connection. The persistent connection is a periodic handshake connection (which may also be referred to as handshake keepalive). In this way, on the ad hoc network, any two electronic devices in the plurality of electronic devices may perform service communication. In addition, because any two electronic devices in the plurality of electronic devices periodically perform a handshake connection, that is, each electronic device may know in advance which online devices are around, two electronic devices that need to perform service communication may directly perform service communication, without first performing mutual discovery and authentication and then performing service communication. Therefore, a discovery and authentication phase of devices in a communication phase is omitted, uncertainty of mutual discovery and authentication of devices is reduced, communication reliability is improved while a communication delay is reduced, and user experience is improved.

In some embodiments, in a process in which the first electronic device performs a handshake connection (that is, maintain the first communication connection) with the second electronic device, the first electronic device may perform the handshake connection with the second electronic device in the first communication manner or in the second communication manner. For example, the first communication manner may be, for example, any one of the WLAN, the P2P, the BR, the BLE, and the PLC manners, and the second communication manner may be, for example, any one of the WLAN, the P2P, the BR, the BLE, and the PLC manners. In some embodiments, the first communication manner and the second communication manner may be the same, or may be different.

It should be noted that, because reliability of each communication medium is different, power consumption of an electronic device is different when the electronic device uses different communication media to perform a handshake connection. On this basis, when the electronic device performs the handshake connection, a communication medium that brings relatively low power consumption of the electronic device may be used. In some embodiments, when the electronic device uses different communication media to perform the handshake connection, a sequence of the communication media corresponding to power consumption generated by the electronic device in ascending order is BLE<BR<Wi-Fi<P2P<PLC. On this basis, when the electronic device includes a plurality of communication media, the electronic device may select a communication medium with relatively low power consumption to perform a handshake connection, so that power consumption of the electronic device can be reduced.

It can be learned from the foregoing embodiment that the first electronic device and the second electronic device have exchanged device information with each other before establishing the persistent connection, and the device information includes the communication medium supported by the electronic device. To be specific, the first electronic device knows the communication medium supported by the second electronic device, and the second electronic device know the communication medium supported by the first electronic device. Therefore, the first electronic device may perform the handshake connection with the second electronic device based on the communication medium exchanged with each other.

For example, the communication medium supported by the first electronic device includes the WLAN, the P2P, the BR, the BLE, and the PLC, and the communication medium supported by the second electronic device includes the WLAN, the P2P, the BR, the BLE, and the PLC. In some embodiments, the first electronic device may send a handshake request message to the second electronic device by using the BLE communication medium, and the second electronic device may reply with a handshake response message by using the WLAN communication medium. In some other embodiments, the first electronic device sends a handshake request message to the second electronic device by using the BLE communication medium, and the second electronic device may reply with a handshake response message by using the BLE, the WLAN, or another communication medium. In some other embodiments, the first electronic device sends a handshake request message to the second electronic device by using the BLE, the WLAN, or the P2P communication medium, and the second electronic device replies with a handshake response message by using the P2P communication medium. In some other embodiments, the first electronic device sends a handshake request message to the second electronic device by using the BLE, the WLAN, or the P2P communication medium, and the second electronic device replies with a handshake response message by using the BLE, the WLAN, or the P2P communication medium.

In an embodiment of this application, the first electronic device may trigger the heartbeat inquiry based on the first time period. In some embodiments, the first electronic device may dynamically adjust, based on a state of the first electronic device, the first time period for triggering the heartbeat inquiry. The first electronic device includes in a static state and in a preset scenario.

For example, when the first electronic device is in the static state for a long time, the first electronic device may trigger a heartbeat inquiry in a dynamic slowdown mode. When the first electronic device is in the preset scenario for a long time, the first electronic device may trigger a heartbeat inquiry in a dynamic acceleration mode.

An example in which the first time period is 5 minutes is used for illustration. For example, if the first electronic device remains in the static state in the first time period and a quantity of times that the first electronic device performs the heartbeat inquiry based on the first time period is greater than a first preset quantity of times (for example, three times), the first electronic device may adjust the first time period to a third time period (for example, 10 minutes). On this basis, if the first electronic device is still in the static state and a quantity of times that the first electronic device performs the heartbeat inquiry based on the third time period is greater than the first preset quantity of times (for example, three times), the first electronic device may continue to increase a length of the third time period (for example, increase to 30 minutes), and so on.

An example in which the first time period is 5 minutes is still used for illustration. For example, if the first electronic device is in the preset scenario in the first time period and a quantity of times that the first electronic device receives the packet sent by the second electronic device is greater than a second preset quantity of times, the first electronic device adjusts the first time period to a fourth time period (for example, adjust from 5 minutes to 3 minutes). On this basis, if the first electronic device is still in the static state and a quantity of times that the first electronic device performs the heartbeat inquiry based on the fourth time period is greater than the second preset quantity of times (for example, three times), the first electronic device may continue to reduce a length of the fourth time period (for example, reduce from 3 minutes to 1 minute), and so on.

In some embodiments, when the preset scenario in which the first electronic device is located changes, the first electronic device restores the fourth time period to the first time period. For example, a change of the preset scenario includes: The first electronic device changes from a screen-off display to a screen-on display, a use status (for example, a user uses the first electronic device to read a text, watch a video, or make a voice call) of the first electronic device changes, an absolute location (for example, a location in a horizontal direction) of the first electronic device changes, a spatial location (for example, longitude and latitude coordinates) of the first electronic device changes, and a vehicle (for example, a bus, a car, an airplane, or an elevator) in which the first electronic device is located changes.

For example, when the user holds the first electronic device and changes from the screen-off display to the screen-on display, the first electronic device restores the first time period. For another example, when the user holds the first electronic device and changes from reading the text to watching the video, the first electronic device restores the first time period. For another example, when the user holds the first electronic device and walks, the first electronic device restores the first time period. For another example, when the user holds the first electronic device and changes from taking the bus to taking the car, the first electronic device restores the first time period.

In some embodiments, when the absolute location of the first electronic device changes, the spatial location changes, or the vehicle changes, the first electronic device re-discovers a nearby device and establishes the first communication connection. Then, the first electronic device receives a response packet sent by the nearby device in the first communication manner in the first time period.

In some embodiments, when a last electronic device of all electronic devices that establish communication connections with the first electronic device is offline, the first electronic device re-discovers a nearby device and establishes a first communication connection. The first electronic device receives a response packet sent by the nearby device, in the first communication manner in the first time period.

In some embodiments, when a network status of a communication system in which a plurality of electronic devices are located changes, the first electronic device sends a network change message to the second electronic device and re-determines a physical communication manner used when the first communication connection is established with the second electronic device.

In some embodiments, a processor of the electronic device may be a general-purpose central processing unit (central processing unit, CPU), a microprocessor, or the like. For example, the CPU may be a single-core processor (single-CPU), or may be a multi-core processor (multi-CPU). When the CPU is a multi-core processor, the module for triggering a heartbeat inquiry by the first electronic device may be disposed on a low-power core (for example, a Sensor Hub or an M3 core). In this way, power consumption of the device can be reduced.

On this basis, each electronic device needs to use an over-the-air (over-the-air, OTA) technology to upgrade data of the electronic device and of a SIM card, and an app installed on the electronic device needs to communicate with a remote cloud server. Therefore, the processor (like the CPU) and a related communication module (like a Wi-Fi chip) of the electronic device need to be periodically woken up. On this basis, in an embodiment of this application, the heartbeat inquiry may be triggered in a wake-up period of the electronic device (that is, the wake-up period is the same as the first time period that is periodically set), so that power consumption of the device can be reduced.

It should be noted that a CPU wake-up function of the electronic device may be preferentially set inside the chip, then may be set on the low-power core, and then may be set on the app, so as to reduce a quantity of times and a time of waking up the CPU of the electronic device.

For example, the plurality of electronic devices may agree on a same wake-up period through negotiation. For example, the plurality of electronic devices first determine one master device through negotiation, and other devices other than the master device are used as slave devices. Then, the master device first determines a wake-up period of the master device, and then the master device sends the wake-up period of the master device to each slave device, so that wake-up periods of the plurality of electronic devices are the same. In some embodiments, the master device may determine the wake-up period of the master device based on a periodic connection established between an app installed on the master device and the remote cloud server.

An example in which the app installed on the master device is WeChat® is used. For example, the remote cloud server periodically pushes a message to the master device, and the master device determines the wake-up period based on a period in which the remote cloud server pushes the message to WeChat®. In some embodiments, the master device may determine the wake-up period based on a period in which the remote cloud server pushes a message to the app installed on the master device; or the master device may determine the wake-up period based on a period in which the remote cloud server pushes messages to a plurality of apps installed on the master device. When the master device determines the wake-up period based on the period in which the remote cloud server pushes the messages to the plurality of apps installed on the master device, for example, the plurality of apps installed on the master device may negotiate with the remote cloud service, the period in which remote cloud service pushes the messages to the plurality of apps installed on the master device is set to a same period.

Figure 15:
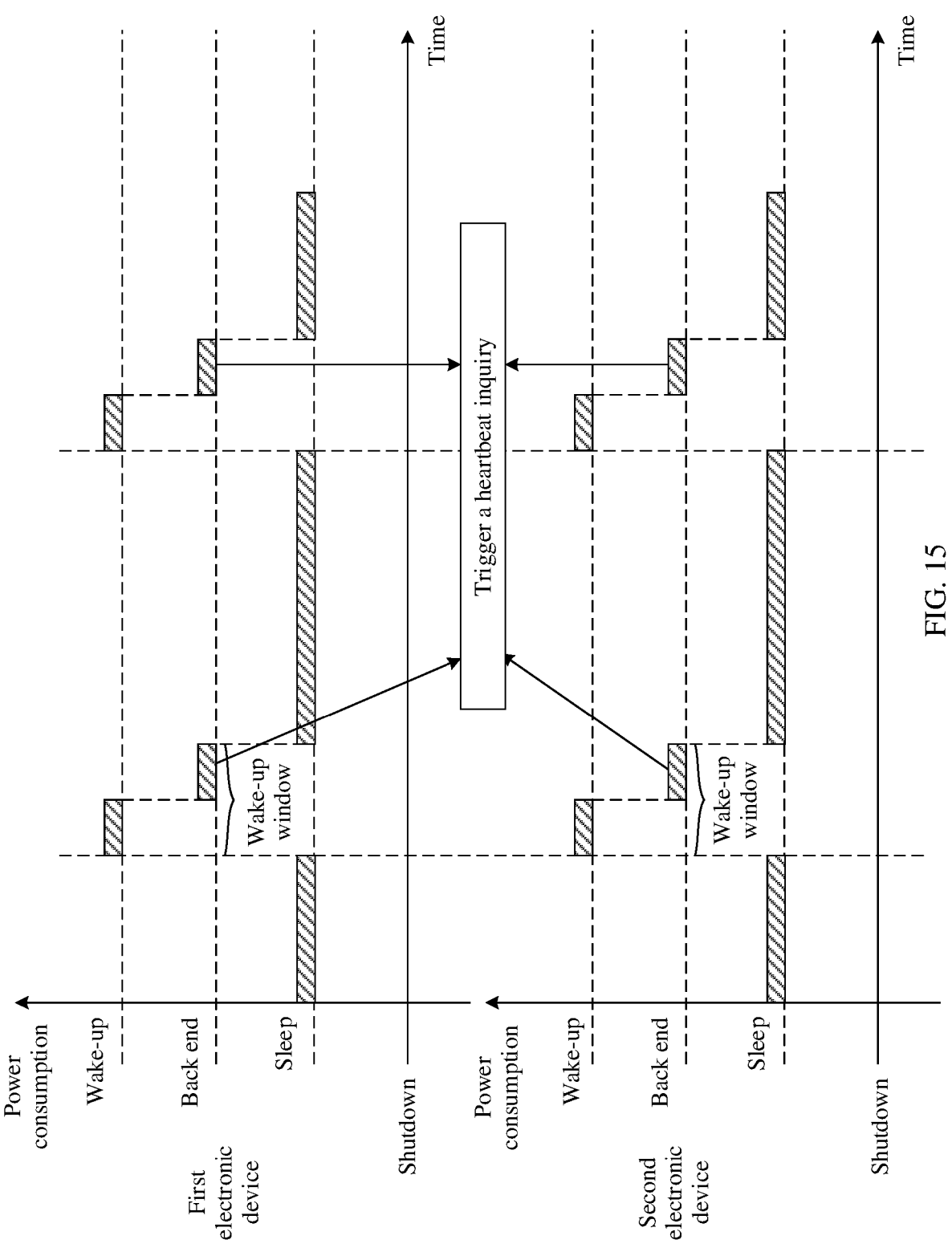
FIG. 15 is a schematic diagram of triggering a heartbeat inquiry in a wake-up period according to an embodiment of this application.

FIG. 15 is a schematic diagram of triggering a heartbeat inquiry in a wake-up period according to an embodiment of this application. With reference to FIG. 14, it can be learned that wake-up periods of the first electronic device and the second electronic device are the same (for example, 5 minutes), and the first electronic device and the second electronic device synchronize wake-up clocks, and align wake-up windows. The wake-up windows include a wake-up state and a back-end state. On this basis, the first electronic device and the second electronic device trigger the heartbeat inquiry in the back-end state.

In addition, still as shown in FIG. 15, when the first electronic device and the second electronic device align the wake-up windows, a window for triggering the heartbeat inquiry is also aligned. To be specific, the first electronic device and the second electronic device trigger the heartbeat inquiry at a same moment. In this way, a duty cycle is dynamically adjusted, so that the CPU (or the chip) can be used in a lowest power consumption manner.

It should be noted that, when the first electronic device is in the static state for a long time, the first electronic device may trigger a heartbeat inquiry in a slowdown mode. To be specific, a period of triggering the heartbeat inquiry by the first electronic device is prolonged (for example, from 5 minutes to 10 minutes, and then to 30 minutes, 1 hour, or even longer). On this basis, if the heartbeat inquiry period (namely, the first time period periodically set) of the first electronic device is greater than the wake-up period (for example, the heartbeat inquiry period is 10 minutes, and the wake-up period is 5 minutes), the first electronic device may forcibly wake up the first electronic device to trigger the heartbeat inquiry.

In this embodiment, wake-up periods of all electronic devices in the plurality of electronic devices are aligned, and the wake-up periods of all electronic devices are the same. On this basis, each electronic device may trigger a heartbeat inquiry in the wake-up period. Therefore, this can reduce device power consumption.

Figure 16:
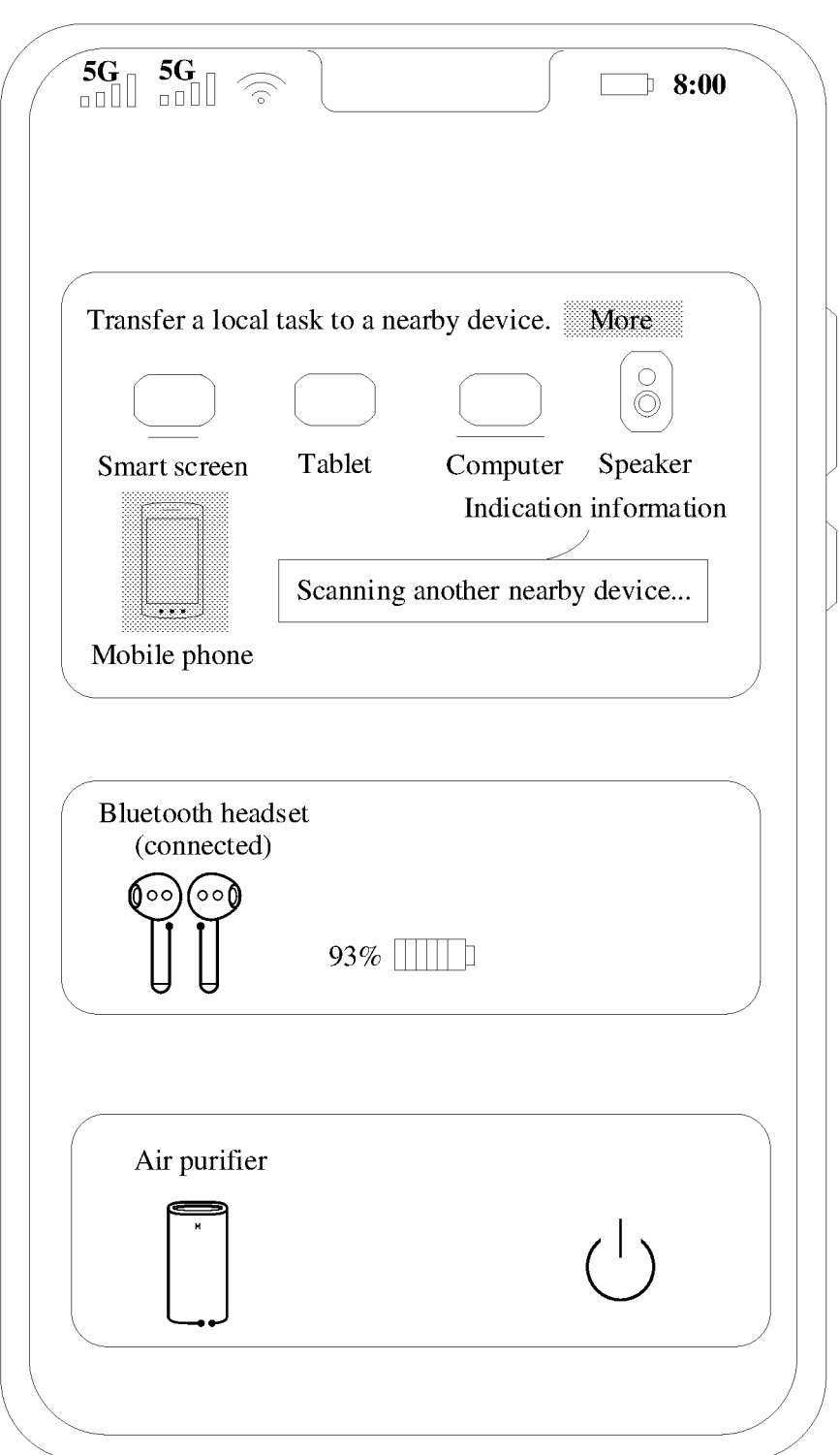
FIG. 16 is a schematic diagram of another interface of a mobile phone according to an embodiment of this application.

An example in which an application scenario is a home scenario and the first electronic device is a mobile phone is used. For example, as shown in FIG. 16, when a user logs in to an app that is on the mobile phone and that controls a home smart device, an app interface of the mobile phone directly displays a device (for example, a smart screen, a tablet, a computer, or a speaker) that completes a handshake connection with the mobile phone. To be specific, the app interface of the mobile phone directly displays a currently online smart home device. Then, the user may directly tap any online device, so that the mobile phone performs service communication with the device. For example, the user may tap the speaker, and play music sound on the mobile phone by using the speaker.

In some embodiments, as shown in FIG. 16, the app interface of the mobile phone further displays a currently offline smart home device (for example, a mobile phone). A display manner of an online smart device is inconsistent with that of an offline smart device. For example, the offline smart device is displayed in gray. In addition, in some embodiments, the app interface of the mobile phone further displays indication information. The indication information indicates that the mobile phone is scanning another nearby device. It should be understood that the another device is a device that has not established a communication connection with the mobile phone, or a device that has established a communication connection with the mobile phone before but then is disconnected from the mobile phone.

It should be noted that, in FIG. 16, the app interface of the mobile phone further includes a device (for example, a Bluetooth headset or an air purifier) that is performing service communication with the mobile phone. For example, the user may listen to music or make a call by using the Bluetooth headset.

In this embodiment, when the user needs to use the mobile phone to start any device in smart home devices, the app interface of the mobile phone directly displays a currently online device. In this way, the user may directly start the device by using the mobile phone, thereby saving a time for scanning the online device by the mobile phone, reducing a waiting time of the user, and improving user experience.

An embodiment of this application provides an electronic device. The electronic device may include a memory and one or more processors. The memory is configured to store computer program code, and the computer program code includes computer instructions. When the processor executes the computer instructions, the electronic device may perform functions or steps performed by the electronic device in the foregoing method embodiments. For a structure of the electronic device, refer to the structure of the electronic device 100 shown in FIG. 9.

Figure 17:
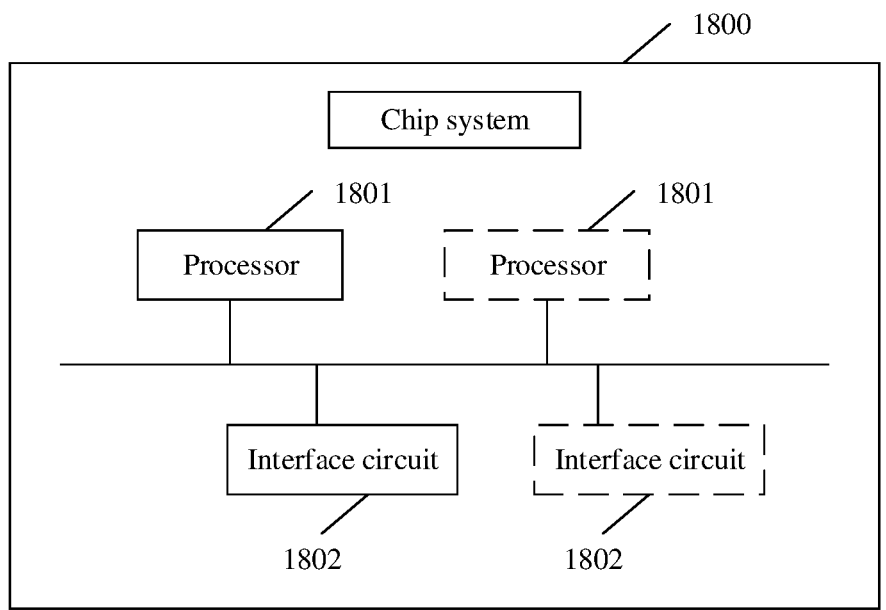
FIG. 17 is a schematic diagram of a structure of a chip system according to an embodiment of this application.

An embodiment of this application further provides a chip system. As shown in FIG. 17, the chip system 1800 includes at least one processor 1801 and at least one interface circuit 1802. The processor 1801 may be the processor 110 shown in FIG. 9 in the foregoing embodiment. The interface circuit 1802 may be, for example, an interface circuit between the processor 110 and the external memory 120, or an interface circuit between the processor 110 and the internal memory 121.

The processor 1801 and the interface circuit 1802 may be interconnected by using a line. For example, the interface circuit 1802 may be configured to receive a signal from another apparatus (for example, a memory in an electronic device). For another example, the interface circuit 1802 may be configured to send a signal to another apparatus (for example, the processor 1801). For example, the interface circuit 1802 may read instructions stored in the memory, and send the instructions to the processor 1801. When the instructions are executed by the processor 1801, the electronic device is enabled to perform steps performed by the mobile phone 180 in the foregoing embodiments. Certainly, the chip system may further include another discrete device. This is not specifically limited in embodiments of this application.

An embodiment of this application further provides a computer storage medium. The computer storage medium includes computer instructions. When the computer instructions are run on an electronic device, the electronic device is enabled to perform functions or steps performed by the electronic device in the foregoing method embodiments.

An embodiment of this application further provides a computer program product. When the computer program product is run on a computer, the computer is enabled to perform functions or steps performed by the electronic device in the foregoing method embodiments.

The foregoing descriptions about implementations allow a person skilled in the art to clearly understand that, for convenient and brief description, division of the foregoing functional modules is taken as an example for illustration. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is only an example. For example, the module or unit division is only logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may be one or more physical units, may be located in one place, or may be distributed on different places. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The storage medium includes any medium that can store program code, like a USB flash drive, a removable hard disk, a read-only memory (read-only memory, ROM), a random access memory (random access memory, RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a communication system comprising a plurality of electronic devices, the method comprising:

establishing, by a first electronic device of the plurality of electronic devices, a first communication connection with a second electronic device of the plurality of electronic devices, wherein the first communication connection comprises that the first electronic device and the second electronic device are connected in a first communication manner and in a second communication manner;

receiving, by the first electronic device, a packet sent by the second electronic device, in the first communication manner in a first time period;

determining, by the first electronic device based on the packet, that the first communication connection with the second electronic device is valid in a second time period; and performing, by the first electronic device, service communication with the second electronic device in the second communication manner in the second time period, wherein a first priority of the first electronic device is higher than a second priority of the second electronic device, wherein the first priority indicates a first hardware performance of the first electronic device, and wherein the second priority indicates a second hardware performance of the second electronic device.

2. The method according to claim 1, wherein, before receiving, by the first electronic device, the packet sent by the second electronic device, in the first communication manner in the first time period, the method further comprises:

broadcasting or unicasting, by the first electronic device, a request packet in the first communication manner or in the second communication manner in the first time period, wherein the request packet indicates that the first electronic device requests to maintain the first communication connection with the second electronic device.

3. The method according to claim 1, wherein when the first communication connection is valid in the second time period, the first electronic device stores connection information of the first communication connection; and performing, by the first electronic device, the service communication with the second electronic device in the second communication manner in the second time period comprises:

resuming, by the first electronic device based on the connection information, the first communication connection established with the second electronic device; and performing the service communication.

4. The method according to claim 1, wherein:

the first priority being higher than the second priority indicates that the first hardware performance is higher than the second hardware performance, the first hardware performance and the second hardware performance each comprise a respective one or more of processor performance, memory performance, hard disk performance, or a network capability, establishing, by the first electronic device, the first communication connection with the second electronic device comprises:

establishing, by the first electronic device, the first communication connection with the second electronic device; and determining the priority of the second electronic device, and determining, by the first electronic device based on the packet, that the first communication connection with the second electronic device is valid in the second time period comprises:

when the priority of the first electronic device is higher than that of the second electronic device, determining, by the first electronic device based on the packet, that the first communication connection with the second electronic device is valid in the second time period.

5. The method according to claim 1, wherein:

the first time period is periodically set, the first time period is set for a first time; and the method further comprises:

when the first electronic device does not receive the packet in the first time period that is set for a second time, determining, by the first electronic device, to be disconnected from the second electronic device; or when the first electronic device does not receive the packet in the first time periods that are set for N consecutive times, determining, by the first electronic device, to be disconnected from the second electronic device; wherein N>1; or when the first time period and the second time period at least partially overlap and the first electronic device does not receive the packet in the first time period within the second time period, determining, by the first electronic device, to be disconnected from the second electronic device.

6. The method according to claim 5, further comprising:

when the first electronic device performs a second service communication with the second electronic device, re-establishing, by the first electronic device, the first communication connection with the second electronic device.

7. The method according to claim 5, further comprising:

determining, by the first electronic device, a wake-up period of the first electronic device based on a periodic connection established between a first application on the first electronic device and a cloud server of the first application, wherein the first application is any application on the first electronic device; and synchronizing, by the first electronic device, the wake-up period to the second electronic device, wherein the wake-up period is the same as the first time period that is periodically set.

8. The method according to claim 7, further comprising:

displaying, by the first electronic device, a first interface in response to an operation of a user on a second application, wherein the first interface comprises at least one electronic device that maintains the first communication connection with the first electronic device, and the at least one electronic device comprises the second electronic device; and performing, by the first electronic device, the service communication with the second electronic device in response to the operation of the user on the second electronic device.

9. The method according to claim 8, wherein:

the first interface further comprises another electronic device that is disconnected from the first electronic device.

10. The method according to claim 8, wherein:

the first interface further comprises indication information, the indication information indicates that a third electronic device is being scanned, and the third electronic device is a device that is in the plurality of electronic devices and is disconnected from the first electronic device; or the third electronic device establishes the first communication connection with the first electronic device for a first time.

11. The method according to claim 1, wherein the packet comprises one of a response packet, an inquiry packet, or a service packet.

12. The method according to claim 1, further comprising:

when the first electronic device remains in a static state in the first time period and a quantity of times that the first electronic device receives the packet sent by the second electronic device is greater than a first preset quantity of times, adjusting, by the first electronic device, the first time period to a third time period, wherein a length of the third time period is greater than a length of the first time period.

13. The method according to claim 1, further comprising:

when the first electronic device is located in a preset scenario in the first time period and a quantity of times that the first electronic device receives the packet sent by the second electronic device is greater than a second preset quantity of times, adjusting, by the first electronic device, the first time period to a fourth time period, wherein a length of the fourth time period is less than a length of the first time period.

14. The method according to claim 13, further comprising:

when the preset scenario in which the first electronic device is located changes, restoring, by the first electronic device, the fourth time period to the first time period, wherein a change of the preset scenario comprises the first electronic device changing from a screen-off display to a screen-on display.

15. The method according to claim 13, further comprising:

when the preset scenario in which the first electronic device is located changes, restoring, by the first electronic device, the fourth time period to the first time period, wherein a change of the preset scenario comprises a change of a use state of the first electronic device.

16. The method according to claim 13, further comprising:

when the preset scenario in which the first electronic device is located changes, re-discovering, by the first electronic device, a nearby device;

establishing the first communication connection, wherein a change of the preset scenario comprises an absolute location change, a spatial location change, and a vehicle change; and receiving, by the first electronic device, a second packet sent by the nearby device, in the first communication manner in the first time period.

17. The method according to claim 1, further comprising:

when a last electronic device of all electronic devices that establish the first communication connection with the first electronic device is offline, re-discovering, by the first electronic device, a nearby device and establishing the first communication connection; and receiving, by the first electronic device, a second packet sent by the nearby device, in the first communication manner in the first time period.

18. The method according to claim 1, further comprising:

when a network status of the communication system in which the plurality of electronic devices are located changes, sending, by the first electronic device, a network change message to the second electronic device; and re-determining a physical communication manner used when the first communication connection is established with the second electronic device.

19. The method according to claim 1, wherein:

the first electronic device comprises a processor, the processor comprises a plurality of processing cores, and the plurality of processing cores comprise a low-power core; and the method further comprises:

receiving, by the first electronic device, the packet sent by the second electronic device in the first time period by using the low-power core.

20. An electronic device, wherein the electronic device is a first electronic device, the electronic device comprises:

one or more processors; and a memory storing computer program code comprising computer instructions, which, when executed by the one or more processors, cause the electronic device to:

establish a first communication connection with a second electronic device, wherein the first communication connection comprises that the first electronic device and the second electronic device are connected in a first communication manner and in a second communication manner;

receive a packet sent by the second electronic device, in the first communication manner in a first time period;

determine based on the packet, that the first communication connection with the second electronic device is valid in a second time period; and perform service communication with the second electronic device in the second communication manner in the second time period, wherein a first priority of the first electronic device is higher than a second priority of the second electronic device, wherein the first priority indicates a first hardware performance of the first electronic device, and wherein the second priority indicates a second hardware performance of the second electronic device.

*   *   *   *   *